US012574785B2

(12) United States Patent
Esswie

(10) Patent No.: US 12,574,785 B2
(45) Date of Patent: Mar. 10, 2026

(54) UPLINK JITTER CONTROL FOR WIRELESS TETHERED DEVICES

(71) Applicant: Dell Products, L.P., Round Rock, TX (US)

(72) Inventor: Ali Esswie, Calgary (CA)

(73) Assignee: Dell Products L.P., Round Rock, TX (US)

( * ) Notice: Subject to any disclaimer, the term of this patent is extended or adjusted under 35 U.S.C. 154(b) by 266 days.

(21) Appl. No.: 18/314,022

(22) Filed: May 8, 2023

(65) Prior Publication Data

US 2024/0381146 A1 Nov. 14, 2024

(51) Int. Cl.
*H04W 24/10* (2009.01)
*H04L 43/087* (2022.01)
*H04W 28/22* (2009.01)

(52) U.S. Cl.
CPC ........... *H04W 24/10* (2013.01); *H04L 43/087* (2013.01); *H04W 28/22* (2013.01)

(58) Field of Classification Search
CPC . H04W 24/10; H04W 28/22; H04W 72/1268; H04W 72/1215; H04L 43/087
See application file for complete search history.

(56) References Cited

U.S. PATENT DOCUMENTS

2019/0215729 A1* 7/2019 Oyman ............... H04L 65/1016
2020/0351910 A1* 11/2020 Joseph .................. H04W 72/21
(Continued)

OTHER PUBLICATIONS

Apple: "Views on Enhancements for XR-Awareness", 3GPP Draft; R2-2303358, 3rd Generation Partnership Project (3GPP), Mobile Competence Centre ; 650, Route Des Lucioles ; F-06921 Sophia-Antipolis Cedex ; France , . vol. RAN WG2, No. e-Meeting; Apr. 17, 2023-Apr. 26, 2023 Apr. 7, 2023 (Apr. 7, 2023), XP052365623, Retrieved from the Internet: _ URL: https://ftp.3gpp.org/tsg_ran/ WG2_RL2/T SGR2_121bis-e/Docs/R2—2303358 .zip R2-2303358 Views on Enhancements for xXR-Awareness,docx : [retrieved on Apr. 7, 2023] p. 4, lines 5-6, paragraph 2.3 , p. 3, lines 1-22, paragraph 2.2, proposal 3; p. 6 p. 5, lines 9-10 p. 4*
(Continued)

*Primary Examiner* — Abdullahi E Salad
(74) *Attorney, Agent, or Firm* — Amin, Turocy & Watson, LLP

(57) ABSTRACT

A user equipment modem device and a user or machine appliance establish a short-range wireless communication link. The modem device may receive from a radio access network node uplink jitter reporting configuration information usable by the modem device to determine when and how to report uplink jitter corresponding to traffic received by the modem device via the short-range wireless communication link. Uplink jitter may be based on an actual arrival of packets by the modem device from the appliance with respect to an expected packet arrival periodicity corresponding to the appliance or an application executing thereon. The node may schedule uplink resources usable by the modem device to transmit packets received from the appliance to the node. The node may transmit a grant of the scheduled uplink resources to the modem device, which may use the granted uplink resources to transmit, to the node, uplink traffic received from the appliance.

20 Claims, 15 Drawing Sheets

(56) References Cited

U.S. PATENT DOCUMENTS

| | | | | |
|---|---|---|---|---|
| 2020/0366423 | A1* | 11/2020 | Lee | H04L 1/1887 |
| 2021/0176778 | A1* | 6/2021 | Lee | H04W 72/23 |
| 2022/0417789 | A1* | 12/2022 | Wittberg | H04W 28/0862 |
| 2024/0205915 | A1* | 6/2024 | Esswie | H04W 76/19 |
| 2024/0323731 | A1* | 9/2024 | Xu | H04B 17/345 |
| 2024/0414585 | A1* | 12/2024 | Esswie | H04W 72/1268 |

OTHER PUBLICATIONS

Naveen Palle et al: "PDU Set Information and Uplink Jitter", 3GPP Draft; R2~-2300723; Type Discussion; _FS_NR_XR_ENH, 3rd Generation Partnership . Project (3GPP), Mobile Competence Centre ; 650, Route Des Lucioles ; F-06921 a Sophia-Antipolis Cedex ; France Y vol. 3GPP RAN 2, No. Athens, GR; Feb. 27, 2023-Mar. 3, 2023, Feb. 17, 2023 (Feb. 17, 2023), XP052245366, : Retrieved from the Internet: URL: https://www.3gpp.org/ftp/TSG_RAN/WG2_R L2/TSGR2_121/Doas/R2-2300723.zip ; R2-2300723 PDU Set Information and UL Jitter .docx [retrieved on Feb. 17, 2023] p. 2, line 5, paragraph 2.2 ; p. 3, lines 3-9 p. 3, lines 11-17 p. 3.*
Retrieved from the Internet: _ URL: https://ftp.3gpp.org/tsg_ran/WG2_RL2/T SGR2_121bis-e/Docs/R2---2303358 .zip R2-2303358 Views on Enhancements for xXR-Awareness , docx : [retrieved on Apr. 7, 2023] p. 4, lines 5-6, paragraph 2.3 , p. 3, lines 1-22, paragraph 2.2, proposal 3; p. 6 p. 5, lines 9-10 p. 4.*
Feb. 17, 2023 (Feb. 17, 2023), XP052245366, : Retrieved from the Internet: URL: https: //www.3gpp.org/ftp/TSG_RAN/WG2_R L2/TSGR2_121/Doas/R2-2300723.zip ; R2-2300723 PDU Set Information and UL Jitter .docx [retrieved on Feb. 17, 2023] p. 2, line 5, paragraph 2.2 ; p. 3, lines 3-9, p. 3, lines 11-17 p. 3.*

Technical specifications (TS) 38.201—"5G; NR; Physical layer; General description", 3GPP TS 38.201 version 15.0.0 Release 15, Sep. 2018, 14 pages.
Technical specifications (TS) 38.331—"5G; NR; Radio Resource Control (RRC); Protocol specification", 3GPP TS 38.331 version 16.1.0 Release 16, Jul. 2020, 886 pages.
Technical specifications (TS) 38.211—"5G; NR; Physical channels and modulation", 3GPP TS 38.211 version 16.2.0 Release 16, Jul. 2020, 136 pages.
Technical specifications (TS) 38.304—"5G; NR; User Equipment (UE) procedures in idle mode and in RRC Inactive state", 3GPP TS 38.304 version 16.1.0 Release 16, Jul. 2020, 41 pages.
Technical specifications (TS) 38.300—"5G; NR; NR and NG-RAN Overall description; Stage-2" 3GPP TS 38.300 version 16.4.0 Release 16, Jan. 2021, 151 pages.
International Search Report and Written Opinion mailed Feb. 20, 2024 for PCT Application No. PCT/US2023/036179, 16 pages.
Apple: "Views on Enhancements for XR-Awareness", 3GPP Draft; R2-2303358, RAN WG2, No. e-Meeting; Apr. 7, 2023, [https://ftp. 3gpp.org/tsg_ran/WG2_RL2/T SGR2_121bis-e/Docs/R2-2303358. zip R2-2303358 Views on Enhancements for XR-Awareness.docx ] 6 pages.
Naveen Palle et al: "PDU Set Information and Upl.ink Jitter", 3GPP Draft; R2-2300723; 3GPP RAN 2, No. Athens, GR; Feb. 17, 2023, [https://www.3gpp.org/ftp/TSG_RAN/WG2_R L2/TSGR2_121/ Docs/R2-2300723.zipR2-2300723 PDU Set Information and UL Jitter.docx] 4 pages.
Notification Concerning Transmittal of Copy of International Preliminary Report on Patentability mailed Nov. 20, 2025 for PCT Application No. PCT/US2023/036179, 10 pages.
European Office Action mailed Dec. 16, 2025 for European Patent Application No. 23817233.2, 3 pages.

* cited by examiner

100

DCI/RRC signal tethering uplink Jitter reporting configuration content

452 → Change threshold percentile between the application layer packet arrival periodicity and experienced modem/receiver (tethering device) packet periodicity, or 454 → minimum threshold of the number of received tethered packets, or PDUs, during a preconfigured rolling period of time 456 → A list, or map, of quantized uplink Jitter ranges associated with quantization indications 458 → Reporting mode indication in terms of {e.g., worst Jitter value, average Jitter value, filtered Jitter value] and filter coefficients;

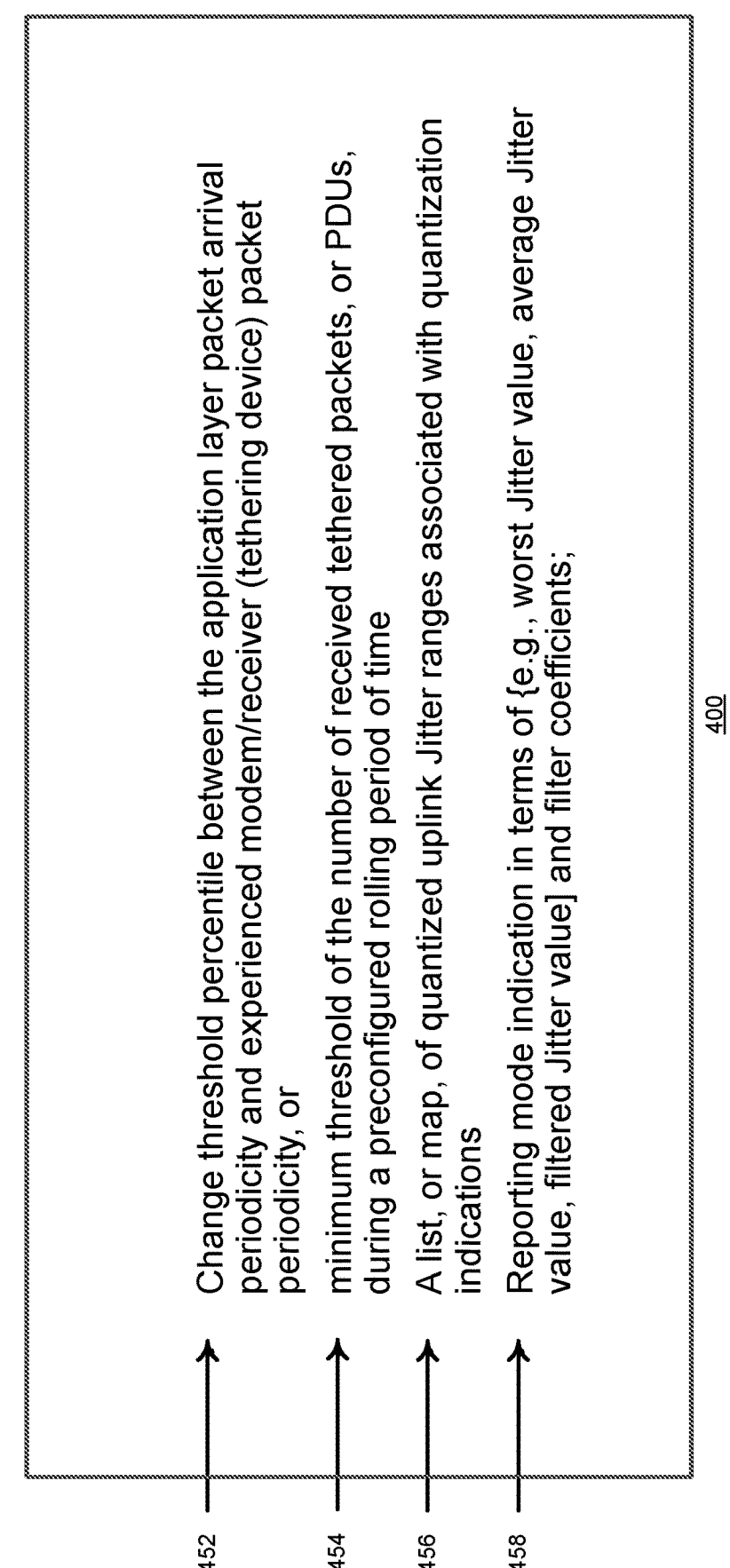

Figure 5:
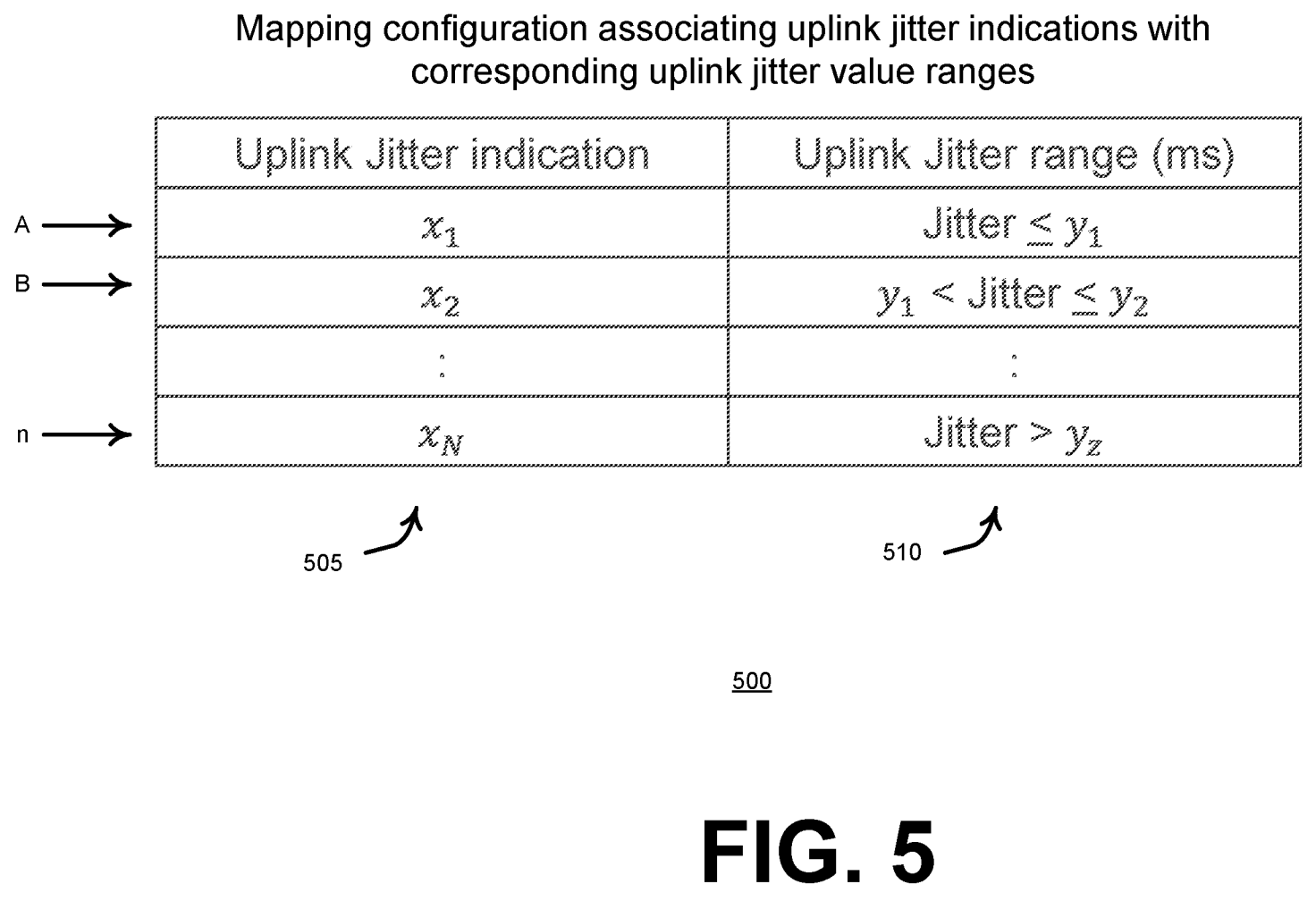

Mapping configuration associating uplink jitter indications with corresponding uplink jitter value ranges

| Uplink Jitter indication | Uplink jitter range (ms) |
|---|---|
| $x_1$ | Jitter $\leq y_1$ |
| $x_2$ | $y_1 <$ Jitter $\leq y_2$ |
| $\vdots$ | $\vdots$ |
| $x_N$ | Jitter $> y_z$ |

Figure 7:
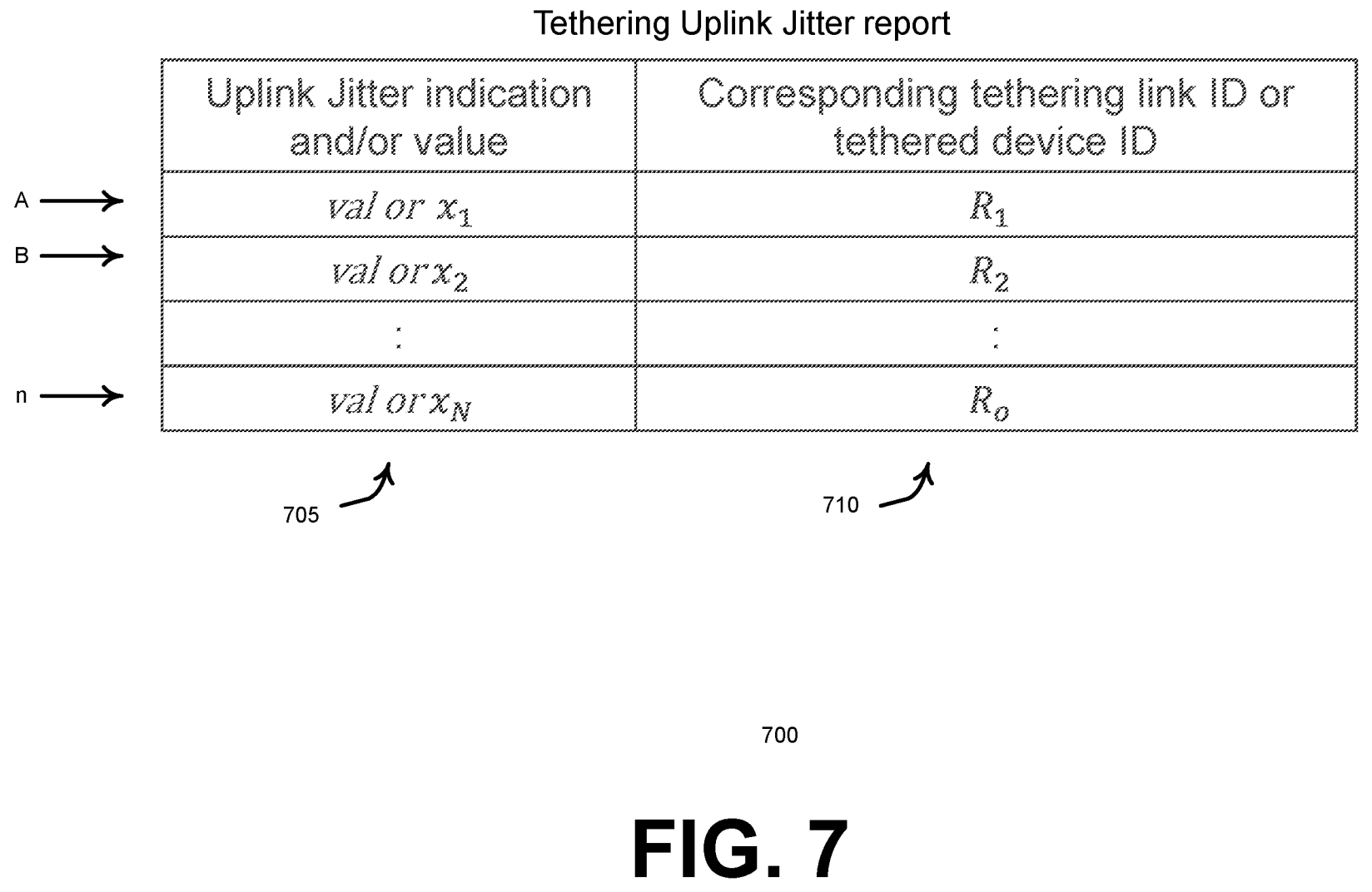

Tethering Uplink Jitter report

| Uplink Jitter indication and/or value | Corresponding tethering link ID or tethered device ID |
|---|---|
| $val\ or\ x_1$ | $R_1$ |
| $val\ or\ x_2$ | $R_2$ |
| $\vdots$ | $\vdots$ |
| $val\ or\ x_N$ | $R_o$ |

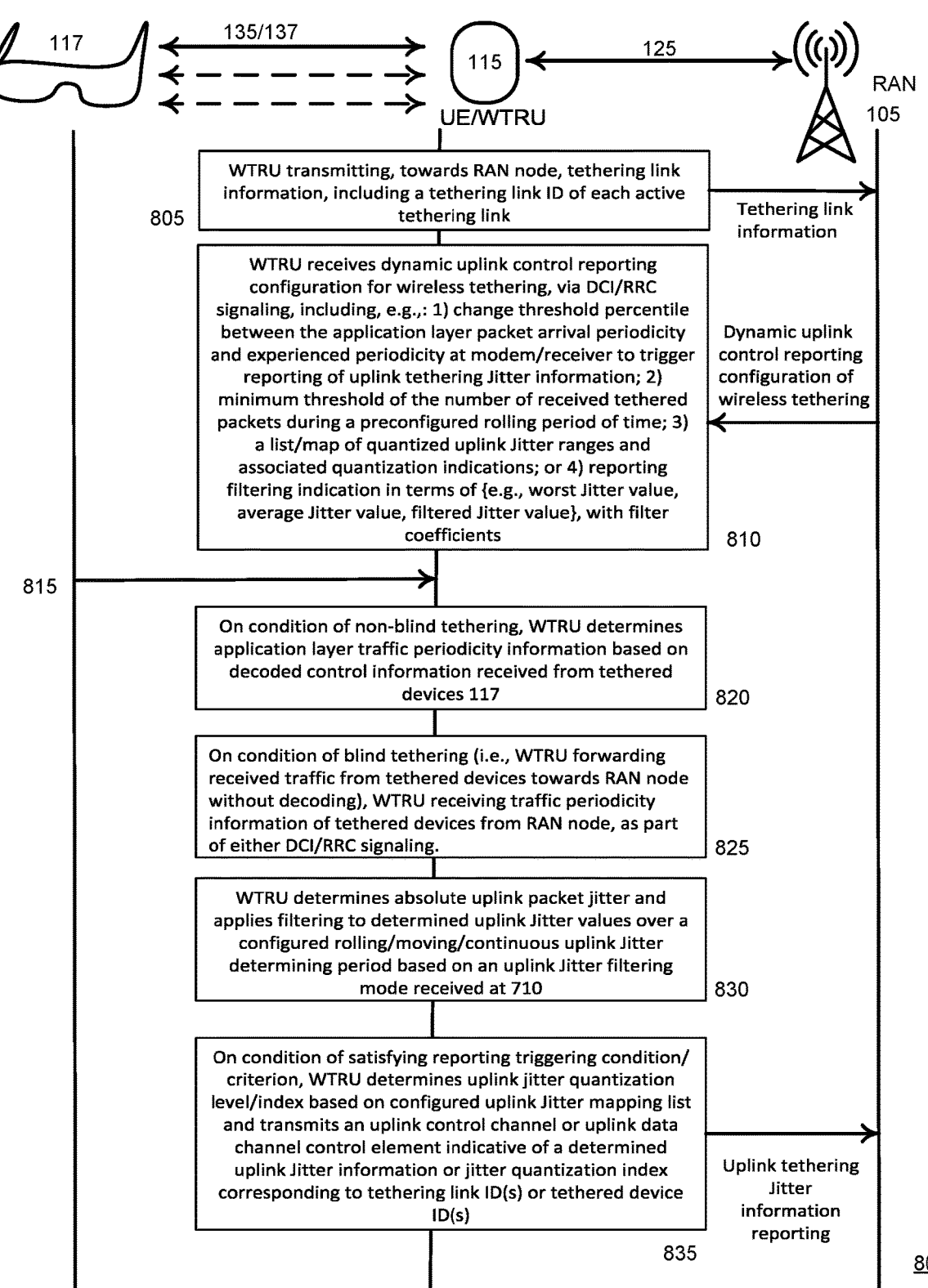

117

135/137

115

UE/WTRU

125

RAN
105

805 WTRU transmitting, towards RAN node, tethering link information, including a tethering link ID of each active tethering link Tethering link information

810 WTRU receives dynamic uplink control reporting configuration for wireless tethering, via DCI/RRC signaling, including, e.g.,: 1) change threshold percentile between the application layer packet arrival periodicity and experienced periodicity at modem/receiver to trigger reporting of uplink tethering Jitter information; 2) minimum threshold of the number of received tethered packets during a preconfigured rolling period of time; 3) a list/map of quantized uplink Jitter ranges and associated quantization indications; or 4) reporting filtering indication in terms of {e.g., worst Jitter value, average Jitter value, filtered Jitter value}, with filter coefficients Dynamic uplink control reporting configuration of wireless tethering

815

820 On condition of non-blind tethering, WTRU determines application layer traffic periodicity information based on decoded control information received from tethered devices 117

825 On condition of blind tethering (i.e., WTRU forwarding received traffic from tethered devices towards RAN node without decoding), WTRU receiving traffic periodicity information of tethered devices from RAN node, as part of either DCI/RRC signaling.

830 WTRU determines absolute uplink packet jitter and applies filtering to determined uplink Jitter values over a configured rolling/moving/continuous uplink Jitter determining period based on an uplink Jitter filtering mode received at 710

835 On condition of satisfying reporting triggering condition/ criterion, WTRU determines uplink jitter quantization level/index based on configured uplink Jitter mapping list and transmits an uplink control channel or uplink data channel control element indicative of a determined uplink Jitter information or jitter quantization index corresponding to tethering link ID(s) or tethered device ID(s)

Uplink tethering Jitter information reporting

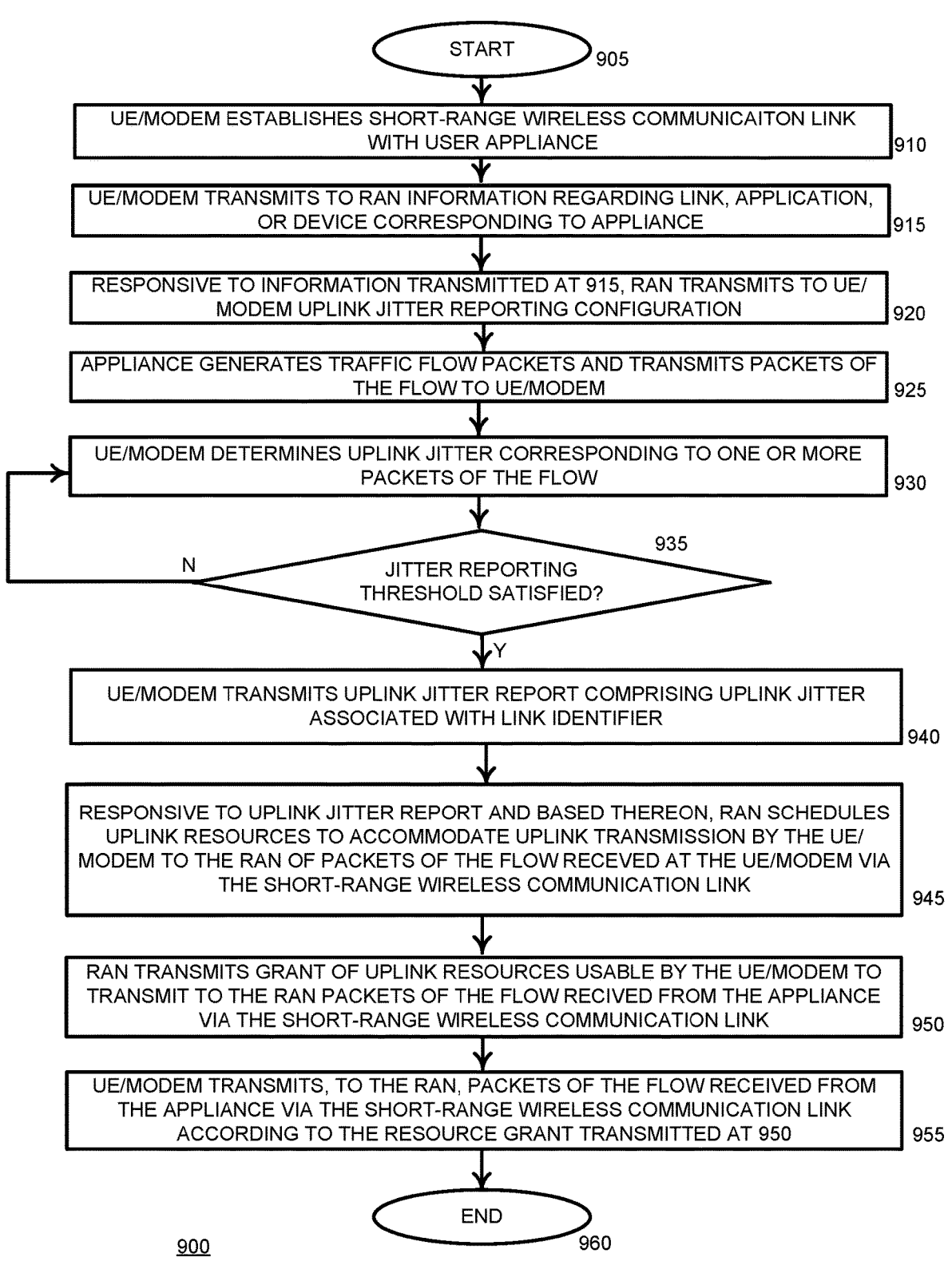

START ⟩ 905

UE/MODEM ESTABLISHES SHORT-RANGE WIRELESS COMMUNICAITON LINK WITH USER APPLIANCE ⟩910

UE/MODEM TRANSMITS TO RAN INFORMATION REGARDING LINK, APPLICATION, OR DEVICE CORRESPONDING TO APPLIANCE ⟩915

RESPONSIVE TO INFORMATION TRANSMITTED AT 915, RAN TRANSMITS TO UE/MODEM UPLINK JITTER REPORTING CONFIGURATION ⟩920

APPLIANCE GENERATES TRAFFIC FLOW PACKETS AND TRANSMITS PACKETS OF THE FLOW TO UE/MODEM ⟩925

UE/MODEM DETERMINES UPLINK JITTER CORRESPONDING TO ONE OR MORE PACKETS OF THE FLOW ⟩930

935

N ⟨ JITTER REPORTING THRESHOLD SATISFIED? ⟩

Y

UE/MODEM TRANSMITS UPLINK JITTER REPORT COMPRISING UPLINK JITTER ASSOCIATED WITH LINK IDENTIFIER ⟩940

RESPONSIVE TO UPLINK JITTER REPORT AND BASED THEREON, RAN SCHEDULES UPLINK RESOURCES TO ACCOMMODATE UPLINK TRANSMISSION BY THE UE/MODEM TO THE RAN OF PACKETS OF THE FLOW RECEVED AT THE UE/MODEM VIA THE SHORT-RANGE WIRELESS COMMUNICATION LINK ⟩945

RAN TRANSMITS GRANT OF UPLINK RESOURCES USABLE BY THE UE/MODEM TO TRANSMIT TO THE RAN PACKETS OF THE FLOW RECIVED FROM THE APPLIANCE VIA THE SHORT-RANGE WIRELESS COMMUNICATION LINK ⟩950

UE/MODEM TRANSMITS, TO THE RAN, PACKETS OF THE FLOW RECEIVED FROM THE APPLIANCE VIA THE SHORT-RANGE WIRELESS COMMUNICATION LINK ACCORDING TO THE RESOURCE GRANT TRANSMITTED AT 950 ⟩955

END ⟩ 960

Figure 10:
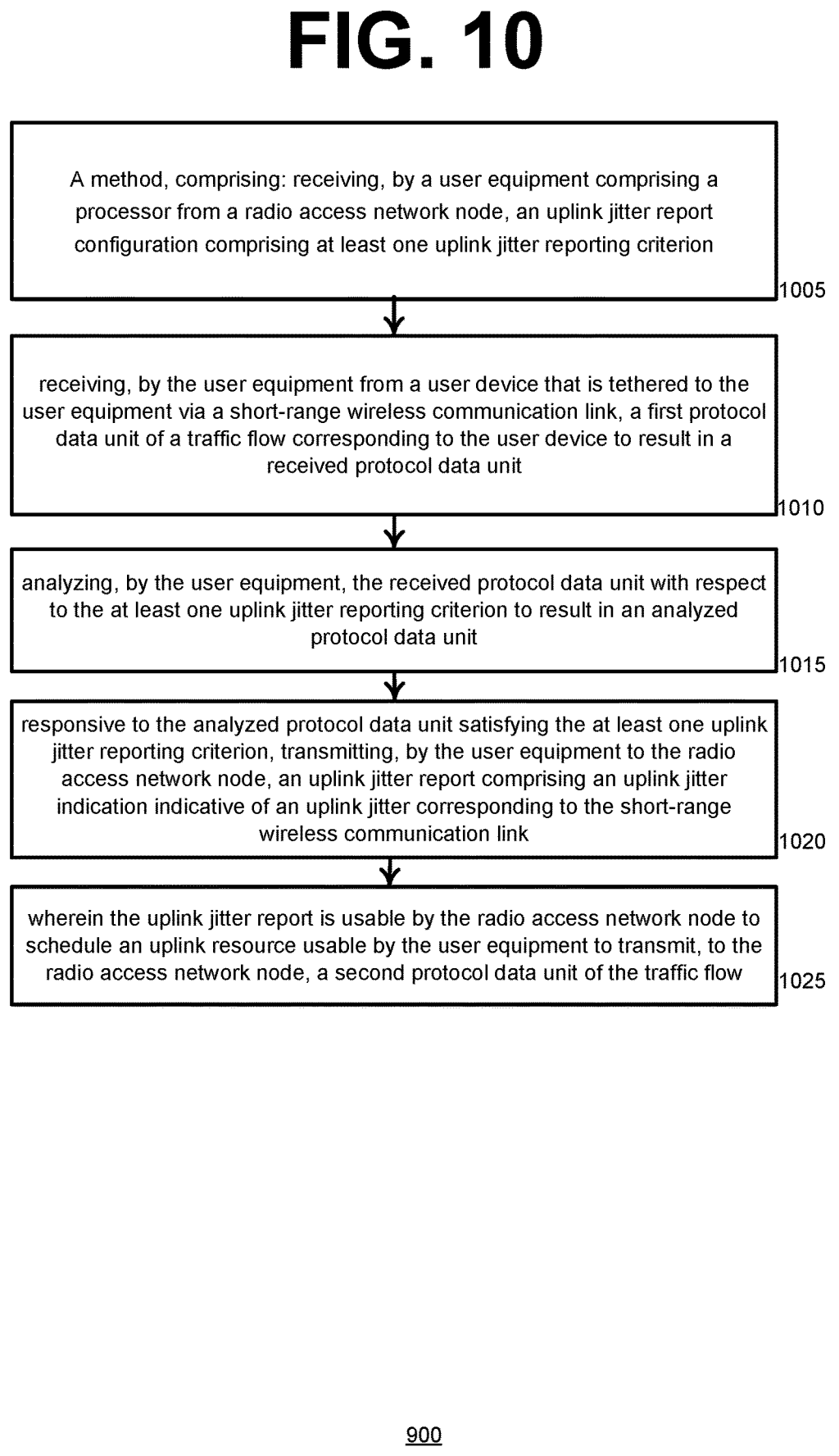

A method, comprising: receiving, by a user equipment comprising a processor from a radio access network node, an uplink jitter report configuration comprising at least one uplink jitter reporting criterion

1005 receiving, by the user equipment from a user device that is tethered to the user equipment via a short-range wireless communication link, a first protocol data unit of a traffic flow corresponding to the user device to result in a received protocol data unit

1010 analyzing, by the user equipment, the received protocol data unit with respect to the at least one uplink jitter reporting criterion to result in an analyzed protocol data unit

1015 responsive to the analyzed protocol data unit satisfying the at least one uplink jitter reporting criterion, transmitting, by the user equipment to the radio access network node, an uplink jitter report comprising an uplink jitter indication indicative of an uplink jitter corresponding to the short-range wireless communication link

1020 wherein the uplink jitter report is usable by the radio access network node to schedule an uplink resource usable by the user equipment to transmit, to the radio access network node, a second protocol data unit of the traffic flow

Figure 11:
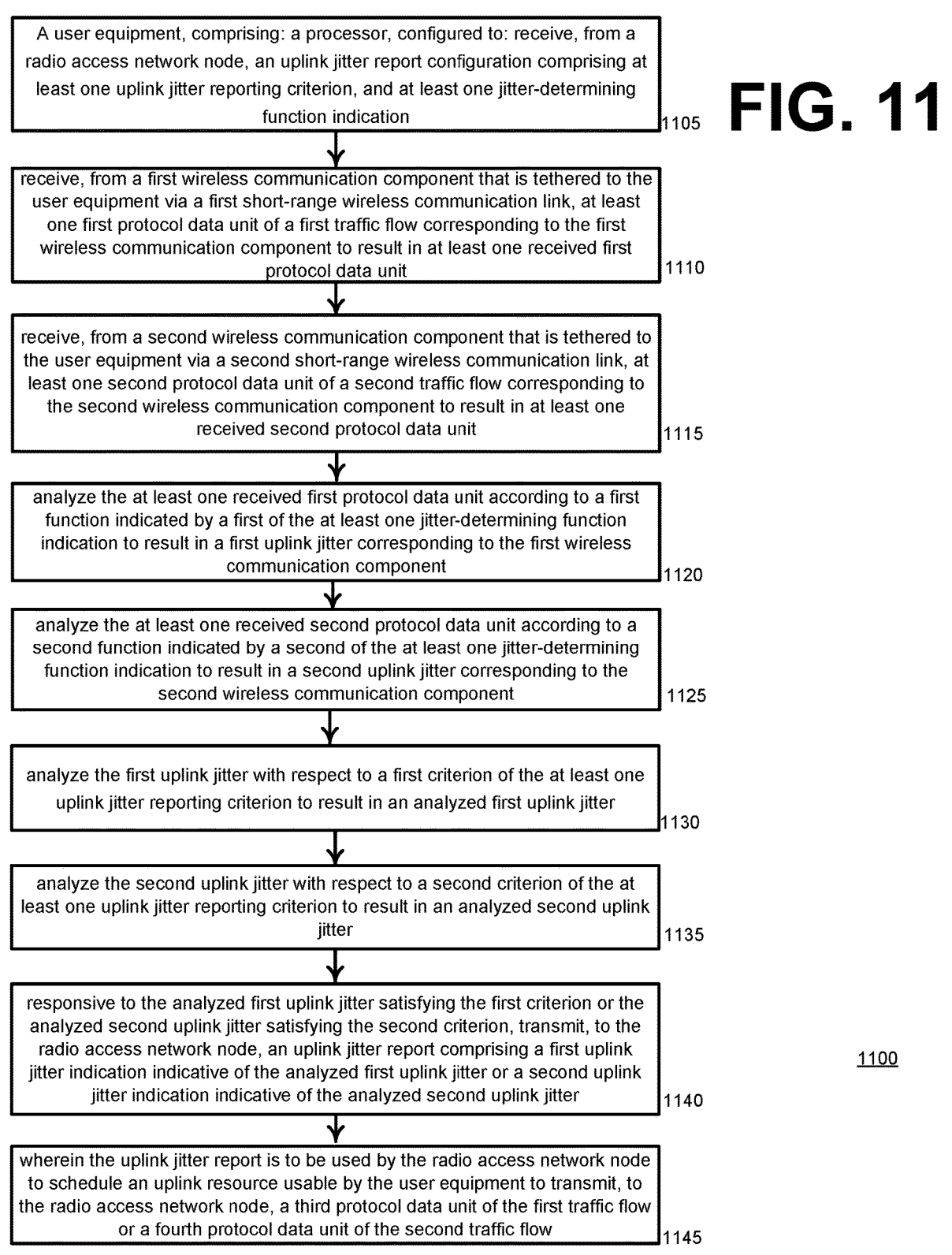

A user equipment, comprising: a processor, configured to: receive, from a radio access network node, an uplink jitter report configuration comprising at least one uplink jitter reporting criterion, and at least one jitter-determining function indication
1105

↓ receive, from a first wireless communication component that is tethered to the user equipment via a first short-range wireless communication link, at least one first protocol data unit of a first traffic flow corresponding to the first wireless communication component to result in at least one received first protocol data unit
1110

↓ receive, from a second wireless communication component that is tethered to the user equipment via a second short-range wireless communication link, at least one second protocol data unit of a second traffic flow corresponding to the second wireless communication component to result in at least one received second protocol data unit
1115

↓ analyze the at least one received first protocol data unit according to a first function indicated by a first of the at least one jitter-determining function indication to result in a first uplink jitter corresponding to the first wireless communication component
1120

↓ analyze the at least one received second protocol data unit according to a second function indicated by a second of the at least one jitter-determining function indication to result in a second uplink jitter corresponding to the second wireless communication component
1125

↓ analyze the first uplink jitter with respect to a first criterion of the at least one uplink jitter reporting criterion to result in an analyzed first uplink jitter
1130

↓ analyze the second uplink jitter with respect to a second criterion of the at least one uplink jitter reporting criterion to result in an analyzed second uplink jitter
1135

↓ responsive to the analyzed first uplink jitter satisfying the first criterion or the analyzed second uplink jitter satisfying the second criterion, transmit, to the radio access network node, an uplink jitter report comprising a first uplink jitter indication indicative of the analyzed first uplink jitter or a second uplink jitter indication indicative of the analyzed second uplink jitter
1140

↓ wherein the uplink jitter report is to be used by the radio access network node to schedule an uplink resource usable by the user equipment to transmit, to the radio access network node, a third protocol data unit of the first traffic flow or a fourth protocol data unit of the second traffic flow
1145

1100

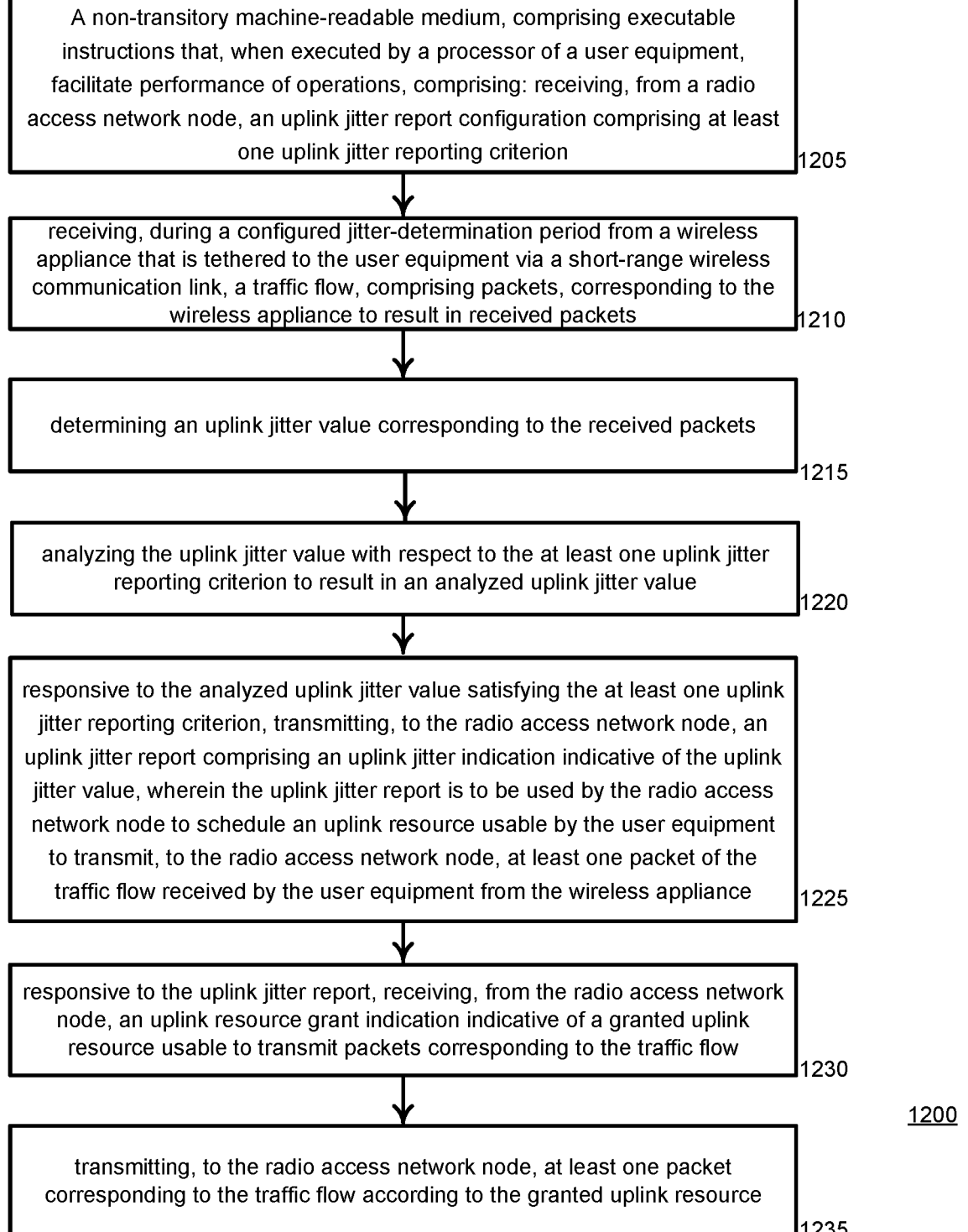

A non-transitory machine-readable medium, comprising executable instructions that, when executed by a processor of a user equipment, facilitate performance of operations, comprising: receiving, from a radio access network node, an uplink jitter report configuration comprising at least one uplink jitter reporting criterion
1205 receiving, during a configured jitter-determination period from a wireless appliance that is tethered to the user equipment via a short-range wireless communication link, a traffic flow, comprising packets, corresponding to the wireless appliance to result in received packets
1210 determining an uplink jitter value corresponding to the received packets
1215 analyzing the uplink jitter value with respect to the at least one uplink jitter reporting criterion to result in an analyzed uplink jitter value
1220 responsive to the analyzed uplink jitter value satisfying the at least one uplink jitter reporting criterion, transmitting, to the radio access network node, an uplink jitter report comprising an uplink jitter indication indicative of the uplink jitter value, wherein the uplink jitter report is to be used by the radio access network node to schedule an uplink resource usable by the user equipment to transmit, to the radio access network node, at least one packet of the traffic flow received by the user equipment from the wireless appliance
1225 responsive to the uplink jitter report, receiving, from the radio access network node, an uplink resource grant indication indicative of a granted uplink resource usable to transmit packets corresponding to the traffic flow
1230

1200 transmitting, to the radio access network node, at least one packet corresponding to the traffic flow according to the granted uplink resource
1235

FIG. 12

UPLINK JITTER CONTROL FOR WIRELESS TETHERED DEVICES

BACKGROUND

The 'New Radio' (NR) terminology that is associated with fifth generation mobile wireless communication systems ("5G") refers to technical aspects used in wireless radio access networks ("RAN") that comprise several quality of service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary. A RAN node may activate a network energy saving mode to reduce power consumption.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method a method may comprise receiving, by a user equipment comprising a processor from a radio access network node, an uplink jitter report configuration comprising at least one uplink jitter reporting criterion. The method may further comprise receiving, by the user equipment from a user device that is tethered to the user equipment via a short-range wireless communication link, a first protocol data unit of a traffic flow corresponding to the user device to result in a received protocol data unit. The method may comprise analyzing, by the user equipment, the received protocol data unit with respect to the at least one uplink jitter reporting criterion to result in an analyzed protocol data unit. Responsive to the analyzed protocol data unit satisfying the at least one uplink jitter reporting criterion, the method may comprise transmitting, by the user equipment to the radio access network node, an uplink jitter report comprising an uplink jitter indication indicative of an uplink jitter corresponding to the short-range wireless communication link. The uplink jitter report may be usable by the radio access network node to schedule an uplink resource usable by the user equipment to transmit, to the radio access network node, a second protocol data unit of the traffic flow. The short-range wireless communication link may be one of: a WiGig link, a Wi-Fi link, or a Bluetooth link, or other similar short-range communication link that is not a long-range wireless link (e.g., not a 5G NR communication link).

The at least one uplink jitter reporting criterion may comprise an evaluation based on a percent difference threshold, wherein the analyzing the received protocol data unit with respect to the at least one uplink jitter reporting criterion comprises comparing, to the percent difference threshold, a difference between an expected protocol data unit transmission periodicity corresponding to the traffic flow at the user device and a protocol data unit reception periodicity corresponding to the traffic flow at the user equipment.

The at least one uplink jitter reporting criterion comprises an evaluation based on a function corresponding to a transmission periodicity associated with the traffic flow at the user device and corresponding to a protocol data unit reception periodicity associated with the traffic flow at the user equipment. The transmission periodicity associated with the traffic flow at the user device may be an expected protocol data unit transmission periodicity corresponding to the traffic flow, and the method may further comprise receiving, by the user equipment from the radio access network node, an expected protocol data unit transmission periodicity indication indicative of the expected protocol data unit transmission periodicity corresponding to the traffic flow.

The at least one uplink jitter reporting criterion, or satisfaction thereof, may comprise an evaluation based on a threshold of a determined number of protocol data units received by the user equipment from the user device during a configured uplink jitter determining period. The uplink jitter report configuration may comprise an analysis mode indication indicative of a function to be applied to the first protocol data unit in the analyzing, by the user equipment, the received protocol data unit with respect to the at least one uplink jitter reporting criterion to result in the analyzed protocol data unit. The uplink jitter corresponding to the short-range wireless communication link may be determined based on the analyzed protocol data unit, and the uplink jitter indication of the uplink jitter report may comprise data representative of the uplink jitter corresponding to the short-range wireless communication link.

The uplink jitter report configuration may comprise an uplink jitter quantization map, or an indication of an uplink jitter quantization map, or an indication of uplink jitter quantization mapping information. The example method may further comprise, based on the analyzed protocol data unit, determining, by the user equipment, an uplink jitter quantization range corresponding to the short-range wireless communication link and based on the uplink jitter quantization map, determining, by the user equipment, an uplink jitter index corresponding to the uplink jitter quantization range. In an embodiment, the uplink jitter report may comprise an uplink jitter index indication that comprises, or that refers to, the uplink jitter index.

In an embodiment, the user device that is tethered to the user equipment may be a first user device and the short-range wireless communication link via which the first user device is tethered to the user equipment may be a first short-range wireless communication link. The traffic flow may be a first traffic flow corresponding to the first user device, the received protocol data unit may be a first received protocol data unit, and the analyzed protocol data unit may be a first analyzed protocol data unit. The uplink jitter report may be a first uplink jitter report and the uplink resource may be a first uplink resource. The uplink jitter report may be a first uplink jitter report and the uplink jitter indication may be a first uplink jitter indication. The analyzing of the received protocol data unit with respect to the at least one uplink jitter reporting criterion may comprise analyzing the received protocol data unit with respect to a first uplink jitter reporting criterion of the at least one uplink jitter reporting criterion. The example method may further comprise receiving, by the user equipment from a second user device that is tethered to the user equipment via a second short-range wireless communication link, a third protocol data unit of a second traffic flow corresponding to the second user device to result in a second received protocol data unit and analyzing, by the user equipment, the second received protocol data unit with respect to a second uplink jitter reporting criterion of the at least one uplink jitter reporting criterion to result in a second analyzed protocol data unit. The example method may further comprise, responsive to the second analyzed protocol data unit satisfying the second uplink jitter reporting criterion, transmitting, by the user equipment to the radio access network node, a second uplink jitter report comprising a second uplink jitter indication indicative of a second uplink jitter corresponding to the second short-range wireless communication link. The second uplink jitter report may be used by, or usable by, the radio access network node to schedule a second uplink resource that is usable by the user equipment to transmit, to the radio access network node, a fourth protocol data unit of the second traffic flow. Thus, the user equipment may manage multiple traffic flows via multiple respective short-range wireless communication links and may. The user equipment may determine, for each link, an uplink jitter value and transmit the respective uplink jitter values via uplink jitter reports corresponding to the different short-range wireless communication links. Uplink jitter reports corresponding to the different short-range wireless communication links may be transmitted as separate uplink jitter reports, or may be transmitted in a composite uplink jitter report that combines uplink jitter reports that comprise uplink jitter information corresponding to different short-range wireless communication links.

The first user device may correspond to a first application. The second user device corresponds to a second application. The first application and the second application may be different applications. The first application and the second application may be associated with different respective expected packet transmission rates. The first application and the second application may be the same application and may corresponding to separate portions of a user devices, for example, the first application may correspond to a pose position of an XR appliance and the second application may correspond to a peripheral portion of the XR appliances. Thus, is an embodiment, the first protocol data unit may correspond to a traffic flow associated with a pose portion of an XR appliance and the first protocol data unit may correspond to a traffic flow associated with a side, or peripheral, portion of an XR appliance. In an embodiment, the first traffic flow and the second traffic flow may be associated with separate user devices, or separate appliances. The first uplink jitter report and the second uplink jitter report are combinable to produce a composite uplink jitter report.

In an embodiment, the example method may further comprise determining, by the user equipment, a first link identifier corresponding to the first short-range wireless communication link, and a second link identifier corresponding to the second short-range wireless communication link. The first uplink jitter report may comprise the first link identifier being associated with the first uplink jitter indication and the second uplink jitter report may comprise the second link identifier being associated with the second uplink jitter indication. Accordingly, determined uplink jitter values, or indices, for one or more short-range wireless links may be associated in an uplink jitter report with the one or more short-range wireless links, or identifiers corresponding thereto, and may be transmitted to the radio access network node by the user on behalf of one or more user devices, such as XR appliances, that are tethered via the short range wireless links to the user equipment.

In another embodiment, a user equipment may comprise a process that may be configured to receive, from a radio access network node, an uplink jitter report configuration comprising at least one uplink jitter reporting criterion, and at least one jitter-determining function indication. The process may be further configured to receive, from a first wireless communication component that is tethered to the user equipment via a first short-range wireless communication link, at least one first protocol data unit of a first traffic flow corresponding to the first wireless communication component to result in at least one received first protocol data unit. The processor may be further configured to receive, from a second wireless communication component that is tethered to the user equipment via a second short-range wireless communication link, at least one second protocol data unit of a second traffic flow corresponding to the second wireless communication component to result in at least one received second protocol data unit. In an example, the first wireless communication component may be a pose portion of an XR appliance, and the second wireless communication component may be a peripheral portion of an XR appliance. The first component and the second component may be part of the same XR component, or other user device. The first component and the second component may be parts of different XR appliances, or different other user devices.

The processor of the user equipment may be further configured to analyze the at least one received first protocol data unit according to a first function indicated by a first of the at least one jitter-determining function indication to result in a first uplink jitter corresponding to the first wireless communication component, and the processor may be further configured to analyze the at least one received second protocol data unit according to a second function indicated by a second of the at least one jitter-determining function indication to result in a second uplink jitter corresponding to the second wireless communication component. For example, the processor may be configured to analyze the at least one received first protocol data unit, which may be part of a first traffic flow, to determine a highest or worst uplink jitter for the first traffic flow and the processor may be configured to analyze the at least one received second protocol data unit, which may be part of a second traffic flow, to determine an average uplink jitter for the second traffic flow. The processor may be further configured to analyze the first uplink jitter with respect to a first criterion of the at least one uplink jitter reporting criterion to result in an analyzed first uplink jitter and to analyze the second uplink jitter with respect to a second criterion of the at least one uplink jitter reporting criterion to result in an analyzed second uplink jitter. In an example, the processor may be configured to cause the user equipment to transmit an uplink jitter report if the first uplink jitter for example a worst uplink jitter during an uplink jitter determining period, exceeds the first criterion, but the processor may be configured not to cause the user equipment to transmit an uplink jitter report or an indication of uplink jitter, corresponding to the second uplink jitter if the second uplink jitter it's analyzed according to a averaging function where in the average of the second uplink jitter during a configured uplink jitter determining period does not exceed the second criterion. Thus, in uplink jitter report may comprise the first uplink jitter, or an indication of the first uplink jitter, but may not comprise the average of the second uplink jitter. Even though the average of the second uplink jitter may have already been determined, including the average of the second uplink jitter may result in an uplink jitter report being larger than if the uplink jitter report did not comprise the average of the second uplink jitter, which would consume or uplink resources to transmit the uplink jitter report than if the uplink channel report only comprises the first uplink jitter that exceeded the first criterion. Responsive to the analyzed first uplink jitter satisfying the first criterion or the analyzed second uplink jitter satisfying the second criterion, the processor may be configured to transmit, by the user equipment to the radio access network node, an uplink jitter report comprising a first uplink jitter indication indicative of the analyzed first uplink jitter or a second uplink jitter indication indicative of the analyzed second uplink jitter. The uplink jitter report may be used by, or usable by, the radio access network node to schedule an uplink resource usable by the user equipment to transmit, to the radio access network node, a third protocol data unit of the first traffic flow or a fourth protocol data unit of the second traffic flow. The third protocol data unit may be received by the user equipment before or after the user equipment receives the first protocol data unit, and the fourth protocol data unit may be received by the user equipment before or after the user equipment receives the second protocol data unit.

The processor of the user equipment may be further configured to receive, from the radio access network node, a first grant of a first uplink resource usable by the user equipment to transmit, to the radio access network node, the third protocol data unit of the first traffic flow and a second grant of a second uplink resource usable by the user equipment to transmit, to the radio access network node, the fourth protocol data unit of the second traffic flow. The process may be further configured to transmit, to the radio access network node using the first uplink resource, the third protocol data unit of the first traffic flow, and the processor may be further configured to transmit, to the radio access network node using the second uplink resource, the fourth protocol data unit of the second traffic flow. It will be appreciated that first uplink resource may be usable by the user equipment transmit the first protocol data unit, or that the second uplink resource may be usable by the user equipment transmit the second protocol data unit.

The first function may comprise a first baseline protocol data unit rate, for example a first expected packet rate, corresponding to the first wireless communication component. The second function may comprise a second baseline protocol data unit rate, or a second expected packet rate, corresponding to the second wireless communication component. The processor of the user equipment may be further configured to determine a first link identifier corresponding to the first short-range wireless communication link, and to determine a second link identifier corresponding to the second short-range wireless communication link. The first uplink jitter indication indicative of the analyzed first uplink jitter may be associated with the first link identifier in the uplink jitter report, and the second uplink jitter indication indicative of the analyzed second uplink jitter may be associated with the second link identifier in the uplink jitter report.

In an embodiment, the processor of the user equipment may be further configured to receive, from the radio access network node, a first baseline protocol data unit rate indication indicative of the first baseline protocol data unit rate corresponding to the first wireless communication component or a first application associated therewith. The processor may be configured to receive, from the radio access network node, a second baseline protocol data unit rate indication indicative of the second baseline protocol data unit rate corresponding to the second wireless communication component or a second application associated therewith. The first baseline protocol data unit rate may be a first expected protocol data unit or the second baseline protocol data unit rate may be a second expected protocol data unit.

In an embodiment, the processor of the user equipment may be further configured to receive, from the first wireless communication component, a first baseline/expected protocol data unit rate indication indicative of the first baseline protocol data unit rate corresponding to the first wireless communication component, and to receive, from the second wireless communication component, a second baseline/expected protocol data unit rate indication indicative of the second baseline protocol data unit rate corresponding to the second wireless communication component.

In another example embodiment, a non-transitory machine-readable medium may comprise executable instructions that, when executed by a processor of a user equipment, facilitate performance of operations, comprising receiving, from a radio access network node, an uplink jitter report configuration comprising at least one uplink jitter reporting criterion. The operations may further comprise receiving, during a configured jitter-determination period from a wireless appliance that is tethered to the user equipment via a short-range wireless communication link, a traffic flow, comprising packets, corresponding to the wireless appliance to result in received packets, determining an uplink jitter value corresponding to the received packets, analyzing the uplink jitter value with respect to the at least one uplink jitter reporting criterion to result in an analyzed uplink jitter value, and responsive to the analyzed uplink jitter value satisfying the at least one uplink jitter reporting criterion, transmitting, to the radio access network node, an uplink jitter report comprising an uplink jitter indication indicative of the uplink jitter value, wherein the uplink jitter report is to be used by the radio access network node to schedule an uplink resource usable by the user equipment to transmit, to the radio access network node, at least one packet of the traffic flow received by the user equipment from the wireless appliance.

Responsive to the uplink jitter report being received by the radio access network node, the operations may further comprise receiving, from the radio access network node, an uplink resource grant indication indicative of a granted uplink resource usable to transmit packets corresponding to the traffic flow. The operations may further comprise transmitting, to the radio access network node, at least one packet corresponding to the traffic flow according to the granted uplink resource.

In an embodiment, the uplink jitter report configuration may comprise an uplink jitter quantization map, or an indication of an uplink jitter quantization map. The operations may further comprise determining an uplink jitter quantization range corresponding to the uplink jitter value in the uplink jitter quantization map. The uplink jitter indication may comprise an uplink jitter index indicative of the uplink jitter quantization range.

BRIEF DESCRIPTION OF THE DRAWINGS

FIG. 4 illustrates an example tethering uplink jitter reporting configuration.

FIG. 5 illustrates an example uplink jitter quantization mapping configuration.

FIG. 7 illustrates an example uplink jitter report.

FIG. 8 illustrates a timing diagram of an example embodiment of determining uplink jitter of a tethered user device and reporting uplink jitter to a radio access network node.

FIG. 9 illustrates a flow diagram of an example embodiment method of determining uplink jitter of a tethered user device and reporting uplink jitter to a radio access network node.

FIG. 10 illustrates a block diagram of an example method embodiment.

FIG. 11 illustrates a block diagram of an example radio access network node.

FIG. 12 illustrates a block diagram of an example non-transitory machine-readable medium embodiment.

DETAILED DESCRIPTION OF THE DRAWINGS

Figure 1:
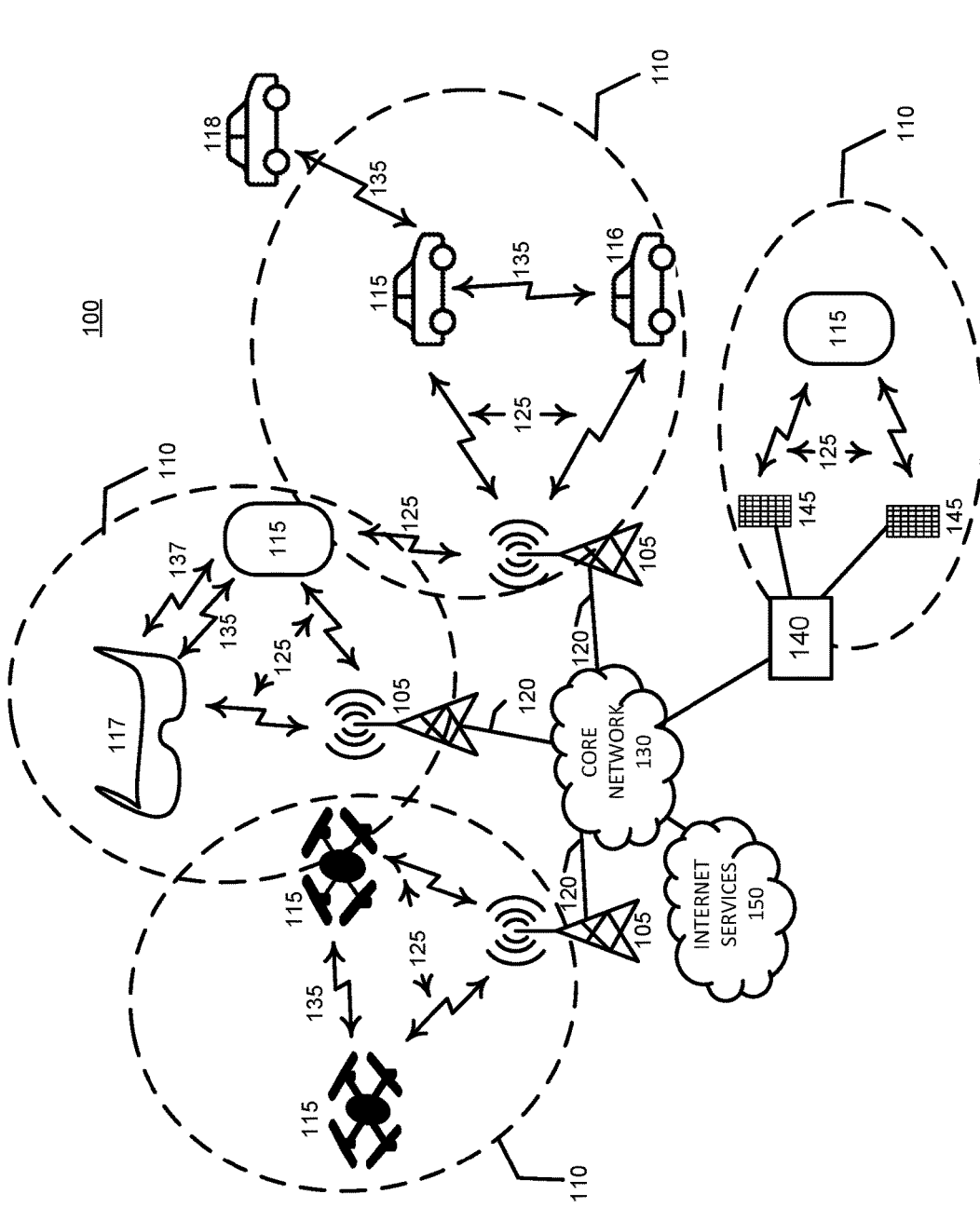
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. In yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

As an example use case that illustrates example embodiments disclosed herein, Virtual Reality ("VR") applications and VR variants, (e.g., mixed and augmented reality) may at some time perform best when using NR radio resources associated with URLLC while at other times lower performance levels may suffice. A virtual reality smart glass device may consume NR radio resources at a given broadband data rate having more stringent radio latency and reliability criteria to provide a satisfactory end-user experience.

5G systems should support 'anything reality' ("XR") services. XR services may comprise VR applications, which are widely adopted XR applications that provide an immersive environment which can stimulate the senses of an end user such that he, or she, may be 'tricked' into the feeling of being within a different environment than he, or she, is actually in. XR services may comprise Augmented Reality ('AR') applications that may enhance a real-world environment by providing additional virtual world elements via a user's senses that focus on real-world elements in the user's actual surrounding environment. XR services may comprise Mixed reality cases ("MR") applications that help merge, or bring together, virtual and real worlds such that an end-user of XR services interacts with elements of his, or her, real environment and virtual environment simultaneously.

Different XR use cases may be associated with certain radio performance targets. Common to XR cases, and unlike URLLC or eMBB, high-capacity links with stringent radio and reliability levels are typically needed for a satisfactory end user experience. For instance, compared to a 5 Mbps URLLC link with a 1 ms radio budget, some XR applications need 100 Mbps links with a couple of milliseconds of allowed radio latency. Thus, 5G radio design and associated procedures may be adapted to the new XR QoS class and associated performance targets.

An XR service may be facilitated by traffic having certain characteristics associated with the XR service. For example, XR traffic may typically be periodic with time-varying packet size and packet arrival rate. In addition, different packet traffic flows of a single XR communication session may affect an end user's experience differently. For instance, a smart glass that is streaming 180-degree high-resolution frames may use a large percentage of a broadband service's capacity for fulfilling user experience. However, frames that are to be presented to a user's pose direction (e.g., front direction) are the most vital for an end user's satisfactory user experience while frames to be presented to a user's periphery vision have less of an impact on a user's experience and thus may be associated with a lower QoS requirement for transport of traffic packets as compared to a QoS requirement for transporting the pose-direction traffic flow. Therefore, flow differentiation that prioritizes some flows, or some packets, of a XR session over other flows or packets may facilitate efficient use of a communication system's capacity to deliver the traffic. Furthermore, XR capable devices (e.g., smart glasses, projection wearables, etc.) may be more power-limited than conventional mobile handsets due to the limited form factor of the devices. Thus, techniques to maximize power saving operation at XR capable device is desirable. Accordingly, a user equipment device accessing XR services, or traffic flows of an XR session, may be associated with certain QoS metrics to satisfy performance targets of the XR service in terms of perceived data rate or end to end latency and reliability, for example.

High-capacity-demanding services, such as virtual reality applications, may present performance challenges to even 5G NR capabilities. Thus, even though 5G NR systems may facilitate and support higher performance capabilities, the radio interface should nevertheless be optimized to support extreme high capacity and low latency requirements of XR applications and XR data traffic.

Turning now to the figures, FIG. 1 illustrates an example of a wireless communication system 100 that supports blind decoding of PDCCH candidates or search spaces in accordance with one or more example embodiments of the present disclosure. The wireless communication system 100 may include one or more base stations 105, one or more user equipment ("UE") devices 115, and core network 130. In some examples, the wireless communication system 100 may comprise a long-range wireless communication network, that comprises, for example, a Long-Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 12.

Continuing with discussion of FIG. 1, base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (CNB), a next-generation NodeB or a giga-NodeB (either of which may be referred to as a bNodeB or gNB), a Home NodeB, a Home eNodeB, or other suitable termi-nology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equip-ment including macro eNBs or gNBs, small cell eNBs or gNBs, or relay base stations, among other examples, as shown in FIG. 1.

UEs 115 and base stations 105 may wirelessly commu-nicate with one another via one or more communication links 125 over one or more carriers. The term "carrier" may refer to a set of radio frequency spectrum resources having a defined physical layer structure for supporting the com-munication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support commu-nication with a UE 115 using carrier aggregation or multi-carrier operation. A UE 115 may be configured with multiple downlink component carriers and one or more uplink com-ponent carriers according to a carrier aggregation configu-ration. Carrier aggregation may be used with both frequency division duplexing (FDD) and time division duplexing (TDD) component carriers.

In some examples (e.g., in a carrier aggregation configu-ration), a carrier may also have acquisition signaling or control signaling that coordinates operations for other car-riers. A carrier may be associated with a frequency channel (e.g., an evolved universal mobile telecommunication sys-tem terrestrial radio access (E-UTRA) absolute radio fre-quency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communi-cation system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink com-munications e.g., in a TDD mode).

A carrier may be associated with a particular bandwidth of the radio frequency spectrum, and in some examples the carrier bandwidth may be referred to as a "system band-width" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHZ)). Devices of the wireless communication system 100 (e.g., the base stations 105, the UEs 115, or both) may have hardware configurations that support communi-cations over a particular carrier bandwidth or may be con-figurable to support communications over one of a set of carrier bandwidths. In some examples, the wireless commu-nication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modu-lation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s = 1/(\Delta f_{max} \cdot N_f)$ seconds, where $\Delta f_{max}$ may represent the maximum sup-ported subcarrier spacing, and $N_f$ may represent the maxi-mum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one component carrier, or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications, such as sidelink communication, may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both. In FIG. 1, vehicle UE 116 is shown inside a RAN coverage area and vehicle UE 118 is shown outside the coverage area of the same RAN. Vehicle UE 115 wirelessly connected to the RAN may be a sidelink relay to in-RAN-coverage-range vehicle UE 116 or to out-of-RAN-coverage-range vehicle UE 118.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHZ.

The wireless communication system 100 may also operate in a super high frequency (SHF) region using frequency bands from 3 GHZ to 30 GHZ, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
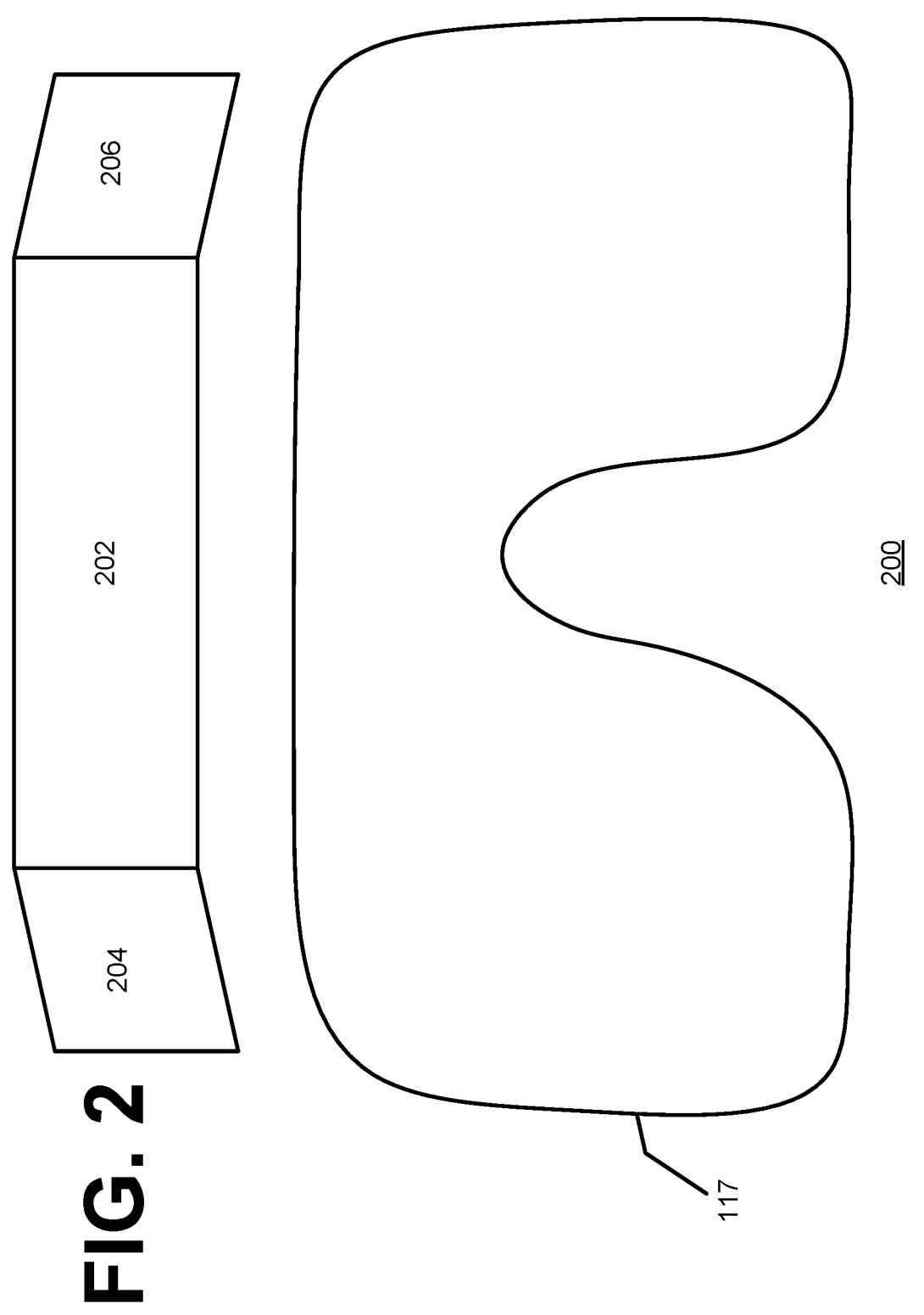
FIG. 2 illustrates an example virtual reality appliance.

Turning now to FIG. 2, the figure illustrates a virtual reality ("VR") application system 200. In system 200, wearable VR appliance 117 is shown from a wearer's, or viewer's, perspective. VR appliance 117 may comprise a center, or pose, visual display portion 202, a left visual display portion 204 and a right visual display portion 206, that may be used to display main visual information, left peripheral visual information, and right peripheral visual information, respectively. As shown in the figure, the portions 202, 204, and 206 are delineated by distinct lines, but it will be appreciated that hardware or software may facilitate gradual transition from main and peripheral information display.

As discussed above, different XR use cases may require different corresponding radio performance. Typically, for XR use cases but unlike for URLLC or eMBB use cases, high-capacity radio links that carry XR data traffic (e.g., data flows that comprise visual information) with stringent radio levels (e.g., latency) and reliability levels are required for a reasonable end user experience. For example, compared to a 5 Mbps URLLC link with a 1 ms radio latency budget, some XR applications require 100 Mbps links with about 2 mS allowed radio latency.

From research, several characteristics have been determined that for XR data traffic: (1) XR traffic characteristics are typically periodic with time-varying packet size and packet arrival rate; (2) XR capable devices may be more power-limited than conventional mobile handsets, (e.g., smart glasses, projection wearables, etc.) due to the limited form factor of the devices; (3) multiple data packet flows corresponding to different visual information of a given XR session are not perceived by a user as having the same impact on the end user experience.

Thus, in addition to needing XR-specific power use efficiency, smart glasses, such as wearable appliance 117, streaming 180-degree high-resolution frames requires broadband capacity for providing an optimum user experience. However, it has been determined that data corresponding to the frames that carry main, or center visual information (i.e., the pose or front direction) are the most vital for end user satisfaction, while the frames corresponding to peripheral visual information have a lesser impact on a user's experience. Therefore, accepting higher latency for less important traffic flows so that resources that would otherwise be allocated to the less important traffic flows can be used for traffic flows corresponding to more important traffic, or to devices that carry the more important traffic, may be used to optimize overall capacity and performance of a wireless communication system, such as a 5-G communication system using NR techniques, method, systems, or devices. For example, a wireless data traffic flow carrying visual information for display on center, or pose, visual display portion 202 may be prioritized higher than a wireless data traffic flow carrying visual information for left visual display portion 204 or for right visual display portion 206.

The performance of a communication network in providing an XR service may be at least partially determined according to satisfaction of a user of the XR services. Each XR-service-using user device may be associated with certain QoS metrics to satisfy the performance targets of the user's service, in terms of perceived data rate, end-to-end latency, and reliability.

A 5G NR radio system typically comprises a physical downlink control channel ("PDCCH"), which may be used to deliver downlink and uplink control information to cellular devices. The 5G control channel may facilitate operation according to requirements of URLLC and eMBB use cases and may facilitate an efficient coexistence between such different QoS classes.

In addition to supporting XR services and applications, 5G NR may facilitate small data transmission which may facilitate industrial automation deployments (e.g., Industry 4.0, which may refer to manufacturing techniques or concepts that use Internet-of things, cloud computing, and artificial intelligence). Notwithstanding stringent radio latency requirements of many 5G use cases (e.g., minimal radio latency from a point in time when a packet is available at transmitter for transmission until the packet is successfully decoded at a receiver), some use cases require consistent packet availability at transmitters/receivers (e.g., with a minimal tolerance for jitter). For 5G automated industrial deployments, packets may be useful for a very short amount of time after the packets are available for transmission, (e.g., packets may correspond to a time sensitive control update of a robotic arm operating in an industrial factory setting). Therefore, it is desirable to control and minimize packet 'jitter', which may refer to variable availability of packets at transmitters or receivers.

Jitter may result from multiple interfaces, transmitters, or receivers processing payload of a traffic flow, inducing corresponding different or variable processing delay. Thus, for transmission in a downlink direction (e.g., from a RAN toward a user equipment), conventional techniques may facilitate downlink jitter control with respect to multiple interfaces (e.g., multiple core network interfaces or radio interfaces) that process traffic payload that may be directed to a device via radio interface.

However, although conventional techniques may facilitate minimizing undesirable effects of downlink jitter, current techniques do not facilitate jitter management techniques to minimize undesirable effects in the uplink direction, because, for most of uplink traffic types, traffic packets are generated by an application of a device and transmitted by a radio transmitter of the same device, such as a user equipment that comprises a 5G NR transceiver. (By having the same device that executes an application that generates a packet also transmits the packet, jitter variability is not an appreciable phenomenon.)

For emerging use cases, such as XR and wirelessly automated industrial deployments, it is foreseen that, due to the limited form factor and battery capacity limitations, device that generate traffic flow packets may not be equipped with a 5G radio receiver or transmitter chain, and may, for example, only be equipped with application layer functionality of the device. A device that is not equipped with 5G NR transceiver circuitry may tether to a user equipment, such as a 5G NR modem, a smart phone, a 5G NR tablet, and the like, that may facilitate transmission of packets to a radio access network node in the uplink direction. A device that generates packets to be transmitted in the uplink direction to a radio access network node (e.g., via a long-range wireless link 125 shown in FIG. 1) may tether to a 5G NR user equipment via a short-range wireless communication link such as, for example, WIFI, WIGIG, Bluetooth, and the like (e.g., a link 137 shown in FIG. 1). Although tethering a device that generates packets to be transmitted to a RAN to a user equipment to make use of the user equipment's long-range wireless link, generating uplink packets at one device and transmitting to a RAN by another may result in variable uplink jitter corresponding to the packets.

Accordingly, embodiments disclosed herein may facilitate dynamic uplink jitter detection and reporting procedure. In an embodiment, a RAN node may adaptively configure a user equipment with a configuration comprising uplink jitter detection information corresponding to one or more short-range wireless links used to tether one or more other device, or components. The configuration may comprise a criterion, or configured triggering condition, that may be used to determine, by a user equipment, when to transmit an uplink jitter report to a radio access network node. According to embodiments disclosed herein, a configured user equipment may dynamically monitor actual packet Jitter over each of one or more wireless tethered links. Jitter may be determined according to a function, for example a difference between a packet rate of packets arriving, via a tethering link, at a user equipment and an expected packet rate that may be based on a packet generation rate, or a packet transmission rate. An expected packet rate may be a configured value. In embodiments disclosed herein, absolute, or raw, determined jitter values may be statistically filtered, smoothed, or otherwise analyzed, for example, according to a configured filter mode or by applying a filter coefficient or filter function over a configured jitter determining period of time. Upon the satisfaction of a report triggering criterion, a user equipment may compile an uplink jitter report and transmit the report to a radio access network node. The report may be indicative of filtered/smoothed/analyzed filter values/indications corresponding to one or more active tethering short-range wireless communication links. In embodiments disclosed herein, uplink jitter filtering over a configured period may facilitate 'absorbing' or 'smoothing' random Jitter fluctuations (e.g., a high absolute jitter value that may statistically deviate from an average jitter value, for example an RMS value), that may not reflect an actual/average/or worst Jitter values, thus minimizing satisfying of a report triggering criterion triggering compiling and transmitting of an uplink jitter report for corresponding to an occasional, or random, jitter that is not representative of overall link conditions during the configured period. Thus, an uplink jitter report may not be transmitted to a RAN unless determined jitter differs from a previously reported uplink jitter, and thus avoiding a RAN responsively changing scheduling of uplink resources granted to the user equipment for a random or occasional deviation from an average jitter corresponding to a link. Using embodiments disclosed herein, a RAN node may become aware of dynamic uplink Jitter fluctuations corresponding to tethering links, (even if tethering links are long-range wireless links) thus facilitating the RAN node dynamically tune its resource scheduling allocations to adapt to actual Jitter performance. Based on uplink jitter information reports disclosed herein, a radio access network node can schedule uplink resources that align with the actual uplink packet availability based on determined jitter), instead of the radio access network node only scheduling uplink resources based on an expected application layer packet rate, which does not take into account jitter that may be induced by a tethering link.

5G and Jitter

As discussed above, 5G NR may support a wide variety of use cases such as XR streaming and Industry 4.0 applications that that may be associated with a need for not only stringent radio latency targets but that also may be associated with a need for consistent jitter relative to packets available for transmission by a user equipment to a RAN. A consistent jitter may correspond to packets of a traffic flow being available deterministically (e.g., with a determined or substantially certain periodicity) and being rapidly transmitted over the radio interface. However, jitter corresponding to a short-range wireless link between a user device, such as an XR/VR appliance, such as smart glasses, may result in inconsistency of packets being available at a UE for transmission thereby, thus resulting in packet availability becoming random/variable instead of being almost deterministic.

The term 'jitter' may refer to a situation where packets are available for transmission at a random or variable rate despite the packets being generated according to a periodic or deterministic rate. Jitter may result from multiple interfaces or multiple entities processing packets at varying rates before packets are transmitted to another interface or entity. Thus, with various entity processing capabilities, interface buffering delays, and buffering delays on shared interfaces, for example, jitter can become highly random. In the downlink directions, multiple core network entities as well as radio access network nodes with cross interfaces are involved in packet processing, and thus, downlink jitter is a problem addressed by conventional techniques for identifying and controlling downlink jitter (e.g., such techniques may include downlink Time Sensitive Communication Assistance Information ("TSCAI") information and TSCAI exchange procedures).

Random, or variable, jitter values, which are unknown at a RAN node using conventional techniques, can lead to degradation of various radio operations. For example, for industrial deployments, control and small payload transmissions are substantially periodic due to the nature of corresponding industrial operations (e.g., a robotic arm needs a motion update with every iterative motion step, which is typically deterministic as occurring every x millisecond). Thus, a radio access network node typically schedules periodic resource allocation to carry such periodic traffic such that the scheduled resources substantially align, or match, temporally (e.g., a packet rate of periodic traffic is predictable thus resources to carry the traffic can be scheduled with few, or without any, excess resources being scheduled). However, with random jitter, packets that may be generated periodically may actually be available at times that do not coincide with scheduled resources, thus making otherwise capacity-efficient and latency-efficient periodic scheduling of resource suboptimal (e.g., a periodic time may be available to carry periodic traffic, but due to jitter, traffic may not be available for transmission, thus, a scheduled resource is wasted).

As discussed above, packets, deterministically (e.g., at a periodic rate) generated (e.g., by an application layer at a user device), may be available for transmission at a random or variable rate. A RAN node may only be aware of an expected application packet generation rate (e.g., the deterministic/periodic rate). Accordingly, being aware of the deterministic/periodic/expected packet rate may result in a RAN node tuning resource scheduling operations based on the deterministic rate to accommodate various applications that generate packets that may need to be transmitted, while disregarding the effect of jitter and a resulting actual packet availability. Since jitter is primarily induced by multiple core network entities, radio entities, and cross interfaces processing a packet before the packet is delivered to a final entity, such as a RAN node, conventional techniques exist for implementing jitter control/notification procedures for downlink packets of traffic flows. For the uplink direction, packets that are generated by an application layer of a device and that are transmitted by a radio chain (e.g., radio frequency transmitter circuitry) of the same device result in minimal jitter. Accordingly, conventional techniques do not address uplink jitter determination, reporting, or uplink resource scheduling by a RAN based thereon.

However, with emerging device categories supporting critical services such as extended reality and industrial automation, user devices may not be equipped with a long-rage wireless radio transmission/receiver chain (e.g., a device may not be equipped with 5G NR transceiver circuitry) due to form factor and battery size limitations. An application executing at the application layer of a user device may generate traffic, and the device may be tethered to a user equipment, such as a 5G NR modem or a 5G NR smartphone, via a short-range wireless link, such that the user equipment/modem performs traffic transmission/reception on behalf of the tethered user device via a long-range radio interface. A short-range wireless tethering link between the user device that generates the uplink traffic and the user equipment device that actually transmits such traffic to a RAN may induce random uplink jitter thus leading to inefficient scheduling, by the RAN, of uplink resources. It will be appreciated that a distinction is made herein between 'user equipment' or 'user equipment device', such as a 5G NR model or a smartphone or tablet having a long-range wireless transceiver, and a 'user device', which may comprise an industrial wireless device that does not have a long-range-wireless transceiver, a wearable device that does not have a long-range-wireless transceiver, an XR device that does not have a long-range-wireless transceiver, or even a smartphone or other device that may have a long-range wireless transceiver that is not being used. A user equipment device comprising a 5G NR transceiver may be referred to as a user equipment modem device. Embodiments disclosed herein facilitate uplink jitter detection and reporting of jitter that may exist between a non-long-range-wireless user device without, or not using, a long-range wireless transmitter to communicate directly with a RAN, and a user equipment that is relaying traffic received from the non-long-range-wireless user device to a RAN via a long-range wireless communication link.

Uplink Jitter Control for Wireless Tethered Devices

Embodiments disclosed herein may facilitate a radio access network node configuring a user equipment acting as a relay for tethered device with a dynamic uplink jitter detection and reporting configuration, which may be referred to as an uplink jitter report configuration. For each of one or more active tethering links (e.g., short-range wireless links that connect a user equipment and a user device), an uplink jitter report configuration may comprise an uplink jitter reporting criterion that may be used by a user equipment that receives the uplink jitter report configuration to determine when to report, to a RAN node, uplink jitter information. The uplink jitter reporting criterion may be, for example, a threshold number of packets or protocol data units ("PDU") exchanged via a short range wireless communication link during a configured period having a configured duration, which may be a rolling, or sliding period, or window, such that a number of packets exchanged from a user device to a user equipment during any period having the configured duration is compared to the configured threshold value. In another example, the uplink jitter reporting criterion may comprise a configured uplink jitter threshold to which a detected, or a determined, uplink jitter may be compared. If the determined, or detected, uplink jitter satisfies the uplink jitter threshold by being larger than the configured jitter threshold, reporting of the uplink jitter by the user equipment to the radio access network node may be triggered. Reporting thresholds may facilitate user equipment avoiding transmission of frequent uplink jitter reports, which may be beneficial when an uplink jitter is low (e.g., even with the small amount of jitter, resources already granted to uplink transmission is sufficient to successfully carry the traffic). Using a configured threshold may also be beneficial by facilitating avoidance of transmitting an uplink jitter report based on a single packet, or a low number of packets, which may exhibit a large uplink jitter (e.g., for a transient tethering link degradation), from causing the reporting of an uplink jitter report when resources scheduled according to a previous uplink jitter report provide satisfactory uplink transmission except for the one packet, or few packets, corresponding to the transient, but high, jitter. Even if occasional retransmission of a packet is needed due to transient jitter, using a threshold to determine when to transmit an uplink jitter report may minimize signaling overhead and may also reduce changing of scheduling of resources to accommodate a jitter condition that may not exist after a change in scheduling of resources is implemented by a RAN node.

A radio access network node may configure, via an uplink jitter report configuration, tethering user equipment modem devices with expected application layer packet arrival rate information (e.g., rate of packet arrival at a user equipment/ modem generated by a tethered user device) corresponding to a tethered user device or corresponding to an application executing on a tethered user device. The configured expected application layer packet arrival rate may be used for jitter calculation and tracking. A configured expected application layer packet rate may be useful in blind tethering cases where tethering devices (e.g., a UE with a 5G NR transceiver) blindly receive and forward traffic and control information received from tethered devices towards the RAN nodes without decoding the packets and without being otherwise aware of a packet rate corresponding to traffic from the tethered packet-generating user device.

In embodiments disclosed herein, a user equipment/modem configured with an uplink jitter reporting configuration may continuously monitor and calculate uplink jitter corresponding to each of one or more active short-range wireless communication links being used to tether one or more user device(s) to a user equipment device. The continuous monitor and calculating of uplink jitter may be performed for a fixed-length, or fixed-duration, period of time. In other words, a user equipment may be continuously determining and updating a jitter corresponding to packets received during an immediately-prior fixed-duration jitter determining period. A tethering user equipment modem device configured with an expected packet arrival rate may determine a timing difference between times of one or more packets being received from tethered devices and one or more expected application layer traffic packet arrivals corresponding to the tethered devices. Upon determining one or more timing differences corresponding to one or more actual packet arrival times and associated expected packet arrival times, a tethering user equipment may apply a configured uplink jitter filtering function to the determined jitter differences, over a configured rolling period/duration (e.g., a fixed-duration jitter determining period) and determine a period-specific overall jitter or a filtered period-specific uplink jitter level, or value, corresponding to each active tethering link.

Upon an uplink jitter, either smoothed or absolute, being determined to satisfy an uplink jitter reporting criterion, a tethering user equipment modem device may generate and transmit an uplink jitter information report to a RAN node, indicating the determined uplink jitter (for example an actual or smoothed jitter, or a quantized indication thereof), and associated tethering link identifier(s) or tethered device identifier(s) corresponding to the indicated jitter(s). Thus, a RAN node may become aware of actual uplink jitter experienced by an active tethering link without having information pertaining to type of the tethering links, e.g., Wi-Fi, WIGIG, Mmwave, etc. and may dynamically fine tune uplink scheduling resource allocation such that the scheduled resources align with actual exhibited uplink jitter instead of aligning with an application-native expected traffic arrival rate.

Using embodiments disclosed herein, tethering user equipment modem devices may facilitate blind tethering to user devices in proximity (e.g., a tethering UE may forward traffic from or towards tethered user devices without decoding) and may assign a tethering link identifier to each of one or more active tethering links. Tethering link identifiers may be associated with a determined uplink jitter in an uplink jitter report reported to a RAN node. Reporting uplink jitter for a given tethering link may facilitate a RAN node in identifying a tethered device and associating the link identifier with reported uplink jitter and adjusting device-specific (e.g., specific to a tethered user device) uplink resource scheduling accordingly. Embodiments disclosed herein facilitate novel signaling information in both downlink and uplink directions for providing uplink jitter monitoring configuration information to a user equipment and for uplink jitter reporting to a RAN node, respectively. A RAN node may transmit statistical/expected packet arrival information corresponding to tethered devices towards tethering devices.

Figure 3A:
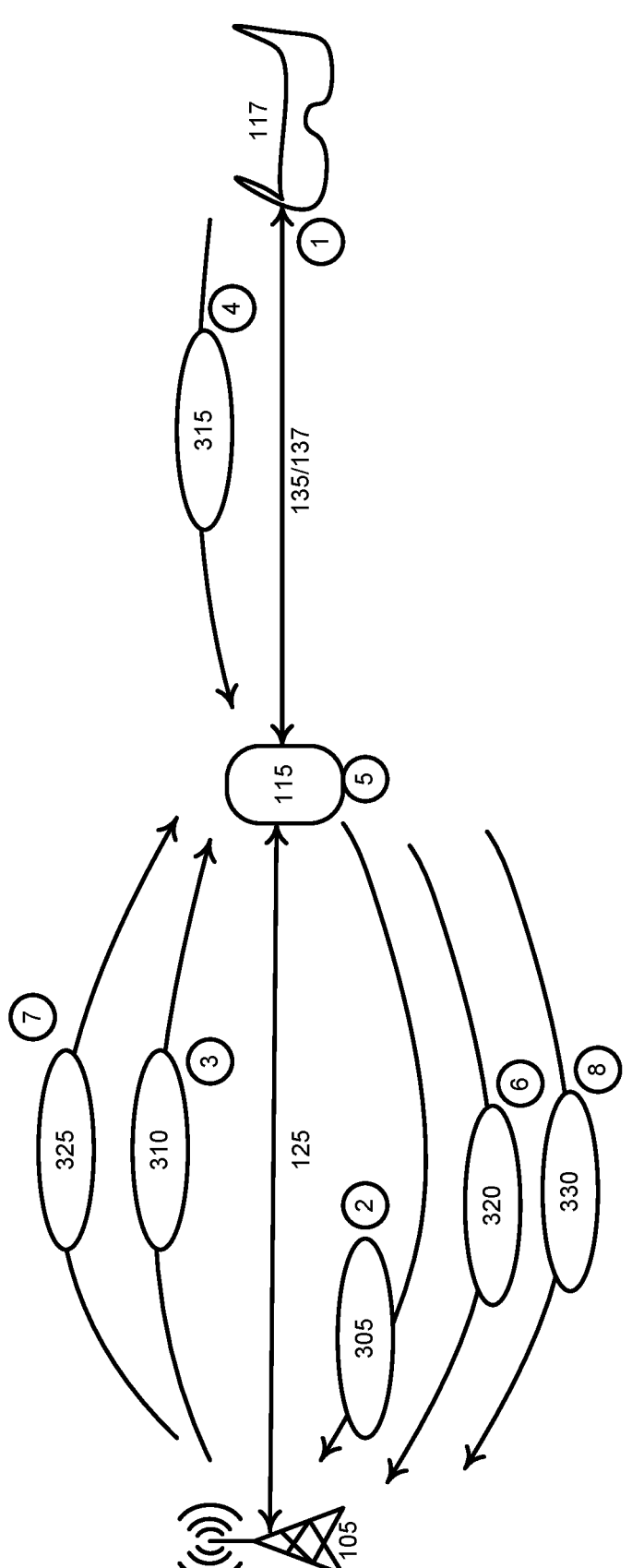
FIG. 3A illustrates an example environment with a user device tethered to a user equipment.

Turning now to FIG. 3A, an uplink jitter detection and reporting procedure is illustrated for an exemplary use case of XR streaming. XR headset appliance 117, which may comprise a smart glass appliance, may establish short-range wireless link, which may be a sidelink link 135 or a Wi-Fi link 137, at act 1 with a long-range wireless user equipment modem device 115, which may be, or which may be part of, a conventional long-range wireless device, such as a 5G NR modem or a smart phone. UE 115 may be referred to as a tethering device and appliance 117 may be referred to as a tethered device. XR appliance 117 may facilitate XR streaming capability and may generate traffic according to a periodicity of an XR application being executed by the XR appliance, and UE 115 may comprise radio transmitter and receiver chain circuitry that may be used for relaying the traffic to or from the XR appliance. Tethering device 115 with the RF chain capability may assign an identifier to active tethering link 135/137. At act 2 UE 115 may transmit to RAN 105 message 305 that may comprise the assigned link identifier corresponding to link 135/137. At act 3, UE 115 may receive from UE 115 an uplink jitter report configuration 310 from serving RAN node 105. Uplink jitter report configuration 310 may be associated with, or corresponding to, the indicated tethering link identifier corresponding to link 135/137.

Tethering device 115 may receive one or more packets of traffic 315 at act 4 via link 135/137, and may continuously monitor and calculate, for example over a fixed-duration jitter determining period, at act 5 experienced uplink jitter corresponding to the one or packets of traffic 315. Uplink jitter corresponding to a packet may be determined as being a timing difference between a time when the packet is actually received by tethering device 115 from tethered device 117 via tethering link 135/137 and a time when the packet was expected to be received by the tethering device.

Expected periodicity, or expected arrival rates, corresponding to an application, such as an XR application, may be based on statistics and may be determined or obtained according to different techniques. For non-blind tethering, where tethering device 115 decodes control and data traffic to or from tethered device 117, tethering device 115 can determine an expected traffic arrival rate corresponding to tethered device 117 because expected arrival rate information may be sent to tethering device 115 as control information transmitted by tethered device 117 towards RAN node 105. Since the control information passes through tethering UE 115, the tethering UE can decode and extract the expected packet rate from the control information.

For blind tethering, where tethering device 115 does not decode data traffic or control traffic from tethered device 117, the tethering device cannot decode and identify expected/statistical traffic arrival information, corresponding to the tethered device, that is only available at the tethered device that originates traffic to be transmitted to RAN 105 and that is provided to the RAN node. In the blind tethering case, RAN node 105 may include statistical/expected arrival information as part of uplink jitter configuration elements in configuration 310. Providing to tethering device 115 expected arrival rate information corresponding to traffic 315 or corresponding to XR device 117 in configuration 310 received from RAN 105 is a novel technique. Tethering device 115 may determine an uplink jitter corresponding to active tethering link 135/137 and may quantize the determined uplink jitter according to a quantization mapping that may be received in configuration 310. If tethering device 115 determines at act 5 that a determined jitter satisfies a configured uplink jitter reporting criterion configured via configuration 310, the tethering device may transmit an uplink jitter information report 320, associated with a tethering link identifier corresponding to link 135/137 or corresponding to appliance 117, at act 6 via a scheduled uplink control channel corresponding to the tethering UE. At act 7, responsive to receiving uplink jitter report 320, RAN 105 may grant an uplink resource in an uplink grant resource message 325, and at act 8 tethering UE 115 may transmit, to RAN 105, a traffic packet corresponding to traffic 315, according to the uplink resource granted in message 325, in an uplink transmission 330. Uplink jitter report 320 transmitted at act 6 may comprise an actual uplink jitter value corresponding to link 135/137 determined at act 5 or corresponding to appliance 117 as determined at act 5, or the uplink jitter report 320 may comprise a quantized jitter index that is indicative of an uplink jitter range in which the uplink jitter determined at act 5 lies. Using an index instead of an actual jitter value may reduce overhead resources used by report 320 if an index can be represented by fewer bits than may be needed to represent an actual jitter value.

Figure 3B:
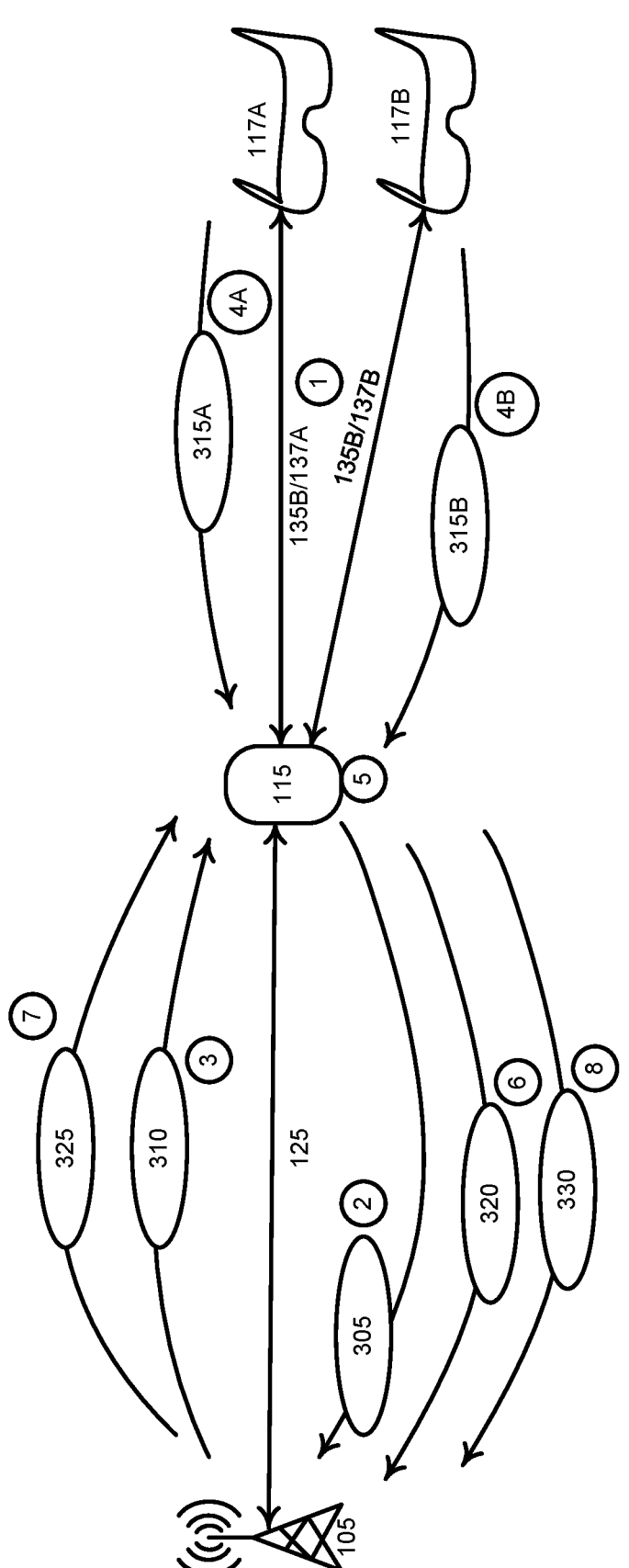
FIG. 3B illustrates an example environment with multiple user devices tethered to a user equipment.

Turning now to FIG. 3B, an example of multiple tethering links is illustrated. 5G modem 115 may handle multiple tethering links 135A/137A and 135B/137B, corresponding respectively, to tethered appliances 117A and 117B. At act 1, tethering device 115 may assign identifiers corresponding to established short-range wireless links 135A/137A and 135B/137B. Upon receiving at act 6 uplink jitter report 320, indicative of uplink jitter corresponding to traffic 315A transmitted at act 4A or corresponding to traffic 315B transmitted at act 4B and corresponding to tethering link identifiers determined at act 1, RAN node 105 may dynamically tune scheduling of uplink resources corresponding to each tethering link 135A/137A or 135B/137B in near real time. RAN node 105 may be or may not be aware of device information or traffic characteristics corresponding to XR devices 117A or 117B (this may depend on the XR devices' capabilities or a configuration of tethering UE 115). Thus, updated scheduling grant message 325 received by tethering UE 115 from the RAN node 105 may be divided into multiple resource grant sets, where each grant set is respectively associated with each of the tethering link identifiers corresponding to link 135A/137A or 135B/137B (instead of an uplink resource being granted to UE 115 or to XR appliance 117A or 117B). Granting uplink resources according to a short-range wireless tethering link rather than according to a device may facilitate flexibility in deployment of tethered devices, such as XR appliances 117A or 117B, that may not necessarily be compatible with 5G NR operation. Thus, RAN node 105 may be configured to support dynamic scheduling of uplink resources with respect to tethering links rather than with respect to device identifiers.

Turning now to FIG. 4, the figure illustrates an example uplink jitter report configuration 400. Configuration 400 may be sent from a RAN node towards a tethering device and may include information elements such as an uplink jitter reporting criterion that may comprise a minimum difference uplink jitter percentile criterion 452. Minimum uplink jitter percentile criterion 452 may comprise a triggering condition indicative to a tethering device to transmit an uplink jitter report when satisfied. If included in configuration 400, criterion 452 may be indicative that a tethering device may transmit an uplink jitter report towards a RAN node when jitter corresponding to an active tethering link satisfies the threshold. A tethering device may continuously calculate an experienced uplink jitter by determining a difference between a received actual packet rate and an expected application layer packet rate (e.g., an application packet rate corresponding to an application running on a tethered device). Accordingly, a tethering device may aggregate, combine, or filter per-packet jitter, over a configured period of time or a configured duration. If a determined overall uplink jitter (e.g., 'overall' corresponding to jitter for the configured duration), aggregated uplink jitter, or filtered uplink jitter exceeds the configured threshold or the configured difference percentile, the tethering device may transmit an uplink jitter information report, to the RAN node, indicative of uplink jitter corresponding to the active tethering link identifier.

Configuration 400 may comprise an uplink jitter reporting criterion 454 that may comprise a minimum number of packets, or PDU sets, over a configured jitter determining period of time per tethering link. If triggering condition indication 454 is configured, a tethering user equipment modem device may only report a determined uplink jitter corresponding to a tethering link via which a number of received packets, or PDU sets, exceeds a threshold criterion indicated by indication 454, during a configured jitter determining period. By using a threshold number of received packets as a criterion, a tethering user equipment modem device may avoid transmitting an uplink jitter report every time a jitter corresponding to a received packet exceeds a jitter threshold value. Thus, even in the situation where a determined uplink jitter corresponding to a received packet is large, which may satisfy a first uplink jitter reporting criterion, using a minimum number of received packets as a secondary, or additional, uplink jitter reporting criterion may ensure that a reported uplink jitter results from a stable flow of packets via the tethering link. Using a minimum received packets threshold 454 may facilitate a tethering user equipment modem device in avoiding being triggered to report a large, determined uplink jitter, corresponding to a tethering link, that results from analysis by the user equipment of a small number of packets. Even though a jitter may be high for one or a few received packets, the high jitter may be transitory and thus may not be desirable to be used by a RAN to adjust scheduling of uplink resources to accommodate a condition relative to the tethering link that may not exist after scheduling of uplink resources is changed. A transitory high uplink jitter may be caused by strong, but temporary, blocking or interference, over a tethering link, and reporting uplink jitter based on a transitory high jitter value may not reflect typical, ongoing uplink jitter conditions with respect to the tethering link. A transitory high uplink jitter corresponding to a short-range wireless tethering link may be due to a weak Wi-Fi signal strength, or a mobile user equipment moving from one Wi-Fi hot spot to another.

Configuration 400 may comprise an uplink jitter quantization map 456, or an indication thereof, of uplink jitter quantization information. If configuration 400 comprises an uplink jitter quantization map 456, or an indication of uplink jitter quantization information, a tethering device may quantize determined uplink jitter information into a predefined index indication. Quantization index indications may correspond to ranges of determined uplink jitter corresponding to a short-range wireless tethering link as described in more detail in reference to FIG. 5.

Continuing with description of FIG. 4, configuration 400 may comprise reporting mode indication 458. Reporting mode indication 458 may be indicative of an aggregation or combination method a tethering device may use for smoothing out determined per packet jitter corresponding to a tethering link. For example, after determining an uplink jitter per each received packet during a configured jitter determining period, a tethering device may select a largest (e.g., worst) uplink jitter for reporting. In another example, a tethering device may select an average (or a mean in another embodiment) uplink jitter value for all received packets during an uplink jitter determining period, or in another example, a user equipment modem device may apply a special filter to jitter values. A tethering device may determine a type of value (e.g., worst, average, etc.) to report in an uplink jitter report based on reporting mode indication 458. In case a special filtering is to be applied to determined uplink jitter values, a RAN may provide a filtering coefficient and type to a tethering device via configuration 400.

Turning now to FIG. 5, an exemplary uplink jitter quantization list configuration/mapping 500 is depicted. Multiple quantized indices 505 may be configured via mapping 500, where each index corresponds to a configured uplink jitter range 510, which may be used to convert a determined uplink jitter corresponding to a tethering link to an index value 505. As an example, if a determined uplink jitter value for a tethering link is a value between $y_1$ and $y_2$ shown in cell 510 of mapping 500, a user equipment modem device may transmit an uplink jitter index $x_2$ shown in cell 505B to a serving RAN.

Figure 6:
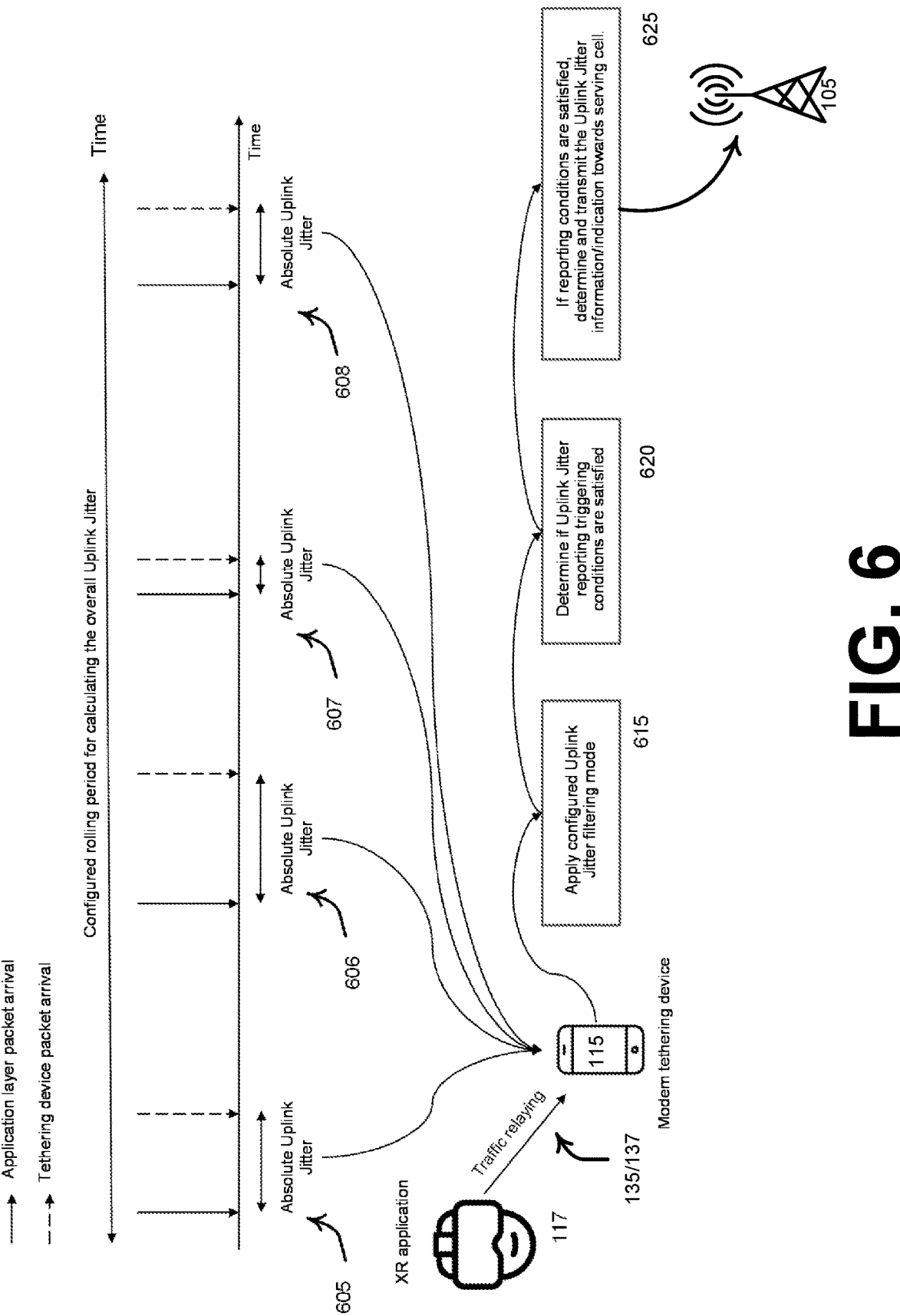
FIG. 6 illustrates a diagram of example uplink jitter filtering and reporting.

FIG. 6 depicts an overall tethering device action flow for determining and reporting uplink jitter information of active tethering link, or links, 135/137. For each tethering link, tethering device 115 may calculate and determine a per packet jitter as a difference in time between receiving a packet and an expected arrival time of the packet that may be determined based on an application layer application type or a device type corresponding to tethered device 117. Tethering device 115 may apply a configured uplink jitter aggregation or filtering function 615 to determined jitter values 605, 606, 607, or 608. Tethering device 115 may determine whether a jitter value resulting from function 615 may satisfy a configured reporting condition, or criterion 620. If criterion 620 is satisfied, tethering device 115 may compile an absolute uplink jitter value or a quantized uplink jitter value into an uplink jitter report 625 and may transmit the uplink jitter report to RAN 105.

FIG. 7 depicts an exemplary uplink jitter report 700 that may comprise determined uplink jitter value(s), or uplink jitter index/indices (e.g., an index described in reference to FIG. 5), in field 705 corresponding to one or more tethering link identifier(s) associated in field 710 with the jitter value(s) or index/indices, that satisfied an uplink jitter reporting criterion. As an example, if an uplink jitter determined for a tethering link having identifier $R_2$, as shown in cell 710B, falls within the range in cell 510B shown in FIG. 5, an uplink jitter report may comprise index $x_2$ shown in FIG. 5 being associated in the report with link identifier $R_2$, as shown in FIG. 7.

Turning now to FIG. 8, the figure illustrates a timing diagram of an example embodiment method 800 to determine uplink jitter corresponding to a tethering link. At act 805, WTRU/UE modem device 115, which may comprise 5G NR circuitry and functionality, may transmit, towards RAN node 105, tethering link information, including a tethering link identifier corresponding to one or more active tethering links 135/137 between UE 115 and user appliance 117. An appliance 117 may comprise an industrial appliance or an XR appliance, for example, that does not include 5G NR functionality. At act 810, WTRU 115 may receive dynamic uplink control reporting configuration information (e.g., configuration 400 described in reference to FIG. 4) corresponding to wireless tethering via a short-range wireless communication link between UE 115 and appliance 117. Continuing with description of FIG. 8, the uplink jitter reporting configuration received at act 810 may be received via a downlink control information signaling message or via a radio resource control signal message.

In an embodiment, uplink jitter configuration information received at act 810 may comprise a change percentile threshold corresponding to a deviation from an expected packet arrival periodicity corresponding to an application executing on appliance 117 and an experienced packet arrival periodicity corresponding to packets of a packet flow received by UE 115 from appliance 117. If the change percentage threshold is exceeded, (e.g., jitter corresponding to actual packet arrival at UE 115 from appliance 117 versus expected packet arrival periodicity is higher than the configured threshold), reporting of uplink jitter corresponding to one or more of links 135/137 may be triggered. It will be appreciated that a change threshold may be configured in terms of an absolute time different between expected and received times of a packet, or may be configured in terms of a percentage relative to an expected periodicity of packet arrival at UE 115.

In an embodiment, uplink jitter configuration information received at act 810 may comprise a minimum threshold number of tethered packets, or PDUs, received during a configured rolling period of time (e.g., a moving fixed-length period of time, or a moving fixed-duration period of time, during which UE 115 may monitor and determine jitter of packets as the packets are received via one or more links 135/137).

In an embodiment, uplink jitter configuration information received at act 810 may comprise a list or map of quantized uplink jitter ranges associated with quantization indications, or indexes, as shown in FIG. 5.

In an embodiment, uplink jitter configuration information received at act 810 may comprise, a reporting filtering indication indicative of a function to be applied to uplink jitter corresponding to traffic flow packets received from appliance 117 during a configured uplink jitter determining period. An indicted function may comprise determining during a jitter determining period, for example, a worst jitter value, an average jitter value, or a filtered jitter value. Uplink jitter configuration information received at act 810 may comprise filter coefficients to be used with a filtering function.

At act 815, WTRU/UE may receive, from an appliance 117, one or more packets of a traffic flow via one or more links 135/137.

In an embodiment, on condition of non-blind tethering (e.g., WTRU/UE 115 is configured to decode payload from tethered device(s) 117 via links 135/137), at act 820 WTRU may determine an expected application layer traffic periodicity information based on decoded control information received from tethered device(s) 117.

In an embodiment, on condition of blind tethering (e.g., WTRU/UE 115 is configured to forward traffic packets received from an appliance 117 towards RAN node 105 without decoding), at act 825 the WTRU/UE may receive expected traffic periodicity information corresponding to tethered devices 117 from RAN node 105 as part of downlink control information signaling or as part of radio resource control signaling. In an embodiment, the expected traffic periodicity information corresponding to tethered devices 117 may be received in configuration information received at act 810.

At act 830, WTRU/UE 115 may calculate and determine uplink jitter corresponding to a link 135/137 based on a timing difference, or offset, (see, e.g., uplink jitters 605, 606, 607, or 608 shown in FIG. 6) between an expected application layer packet arrival periodicity and an actual received packet periodicity and during a configure uplink jitter determining period. Continuing with description of FIG. 8, WTRU/UE 115 may filter calculated/determined absolute/raw uplink jitter values over a configured uplink jitter rolling, or moving, fixed-length uplink jitter determining period, based on an uplink jitter filtering mode indication received in uplink jitter reporting configuration information received at act 810. On condition of a jitter determined at act 830 satisfying, at act 835, an uplink jitter reporting criterion, or criteria, received at act 810, ATRU/UE 115 may transmit an uplink jitter report to RAN 105. RAN 105 may schedule uplink resources usable by UE 115 to transmit uplink traffic received from appliance 117 to RAN 105 based on the uplink hitter report. UE 115 may transmit to RAN 105 an uplink jitter report via a control channel or via an uplink data channel control element. An uplink jitter report transmitted at act 835 may comprise an indication of uplink jitter determined at act 830. WTRU/UE 115 may determine an uplink jitter quantization level/index based on an uplink jitter mapping list that may have been included in, or may have been indicated by an indication in, uplink jitter reporting configuration information received at act 810. An uplink jitter report transmitted at act 835 may comprise an uplink jitter value, or an uplink jitter quantization index corresponding thereto, that is associated with a tethering link identifier corresponding to a link 135/137, or that is associated with a device identifier corresponding to a tethered device 117.

Turning now to FIG. 9, the figure illustrates a flow diagram of an example embodiment 900. Method 900 begins at act 905. At act 910, a tethering user equipment comprising a 5G NR modem, such as a tethering UE 115 described herein in reference to other figures, may establish a communication session with a user appliance such as a smart glass XR appliance 117, also described elsewhere herein, via a short-range wireless communication link, such as via a sidelink communication link 135 or via a Wi-Fi link 137 also described elsewhere herein. The user equipment modem device may determine a link identifier, assign a link identifier, or otherwise identify the short-range wireless communication link. At act 915, the user equipment modem device may transmit to a radio access network node information corresponding to the short-range wireless communication link, information corresponding to an application executing on the user appliance, or information corresponding to the user appliance.

At act 920, responsive to the information transmitted by the user equipment modem device at act 915, the radio access network node transmits to the user equipment modem device uplink jitter reporting configuration information, such as configuration information 400 described in reference to FIG. 4. Continuing with description of FIG. 9, at act 925, the user appliance, or an application running thereon, may generate packets of a traffic flow, for example, a traffic flow facilitating an XR experience at the user appliance. At act 930, the user equipment modem device may determine uplink jitter corresponding to one or more packets of the traffic flow transmitted by the user appliance device to the user equipment modem device at act 925.

At act 935, the user equipment modem device may determine whether an uplink jitter reporting criterion, for example a threshold, received in the uplink jitter reporting configuration transmitted by the radio access network node at act 920, is satisfied. If the uplink jitter reporting threshold criterion is determined to not be satisfied at act 935, method 900 returns to act 930 and the user equipment modem device may continue to receive packets generated by the user appliance at act 925 and determine uplink jitter corresponding thereto. In an embodiment, the user equipment modem device may receive and buffer packets during an uplink jitter determination period, or duration, according to the configuration information transmitted by the radio access network node to the user equipment modem device at act 920.

If a determination is made at act 935 that an uplink jitter reporting criterion has been satisfied by the uplink jitter determined at act 930, method 900 advances to act 940. At act 940, the user equipment modem device may transmit an uplink jitter report comprising uplink jitter information determined at act 930. The uplink jitter report may associate the uplink jitter determined at act 930 with a link identifier corresponding to the short-range wireless communication link determined and established at act 910. The uplink jitter report may comprise an uplink quantization index corresponding to a jitter range that bounds the jitter determined at act 930. The uplink jitter report may associate the uplink jitter determined at act 930, or an uplink jitter quantization index corresponding thereto, with a device identifier corresponding to the user appliance device as determined at act 910.

At act 945, responsive to and based on receiving the uplink jitter report transmitted by the user equipment modem device that act 940, the radio access network node may schedule one or more uplink resources to accommodate uplink transmission by the user equipment modem device, to the radio access network node, of packets of the flow received at the user equipment modem device via the short-range wireless communication link established and identified at act 910. At act 950, the radio access network node may transmit a grant of the one or more uplink resources, scheduled at act 945, to the user equipment modem device. The one or more uplink resources granted in the grant transmitted at act 950 may be usable by the user equipment modem device to transmit to the radio access network node packets of the traffic flow generated by, and received from, the user appliance device via the short-range wireless communication link. At act 955, the user equipment modem device may transmit, to the radio access network node, packets of the flow received from the user appliance device via the short-range wireless communication link. The user equipment modem device may transmit the packets received from the user appliance device to the radio access network node according to the one or more uplink resources received in a grant transmitted by the radio access network node to the user equipment modem device at act 950. Accordingly, the radio access network nodes may schedule uplink resources to be used by the user equipment modem device to transmit to the radio access network node packets of a traffic flow generated by an application at a device other than the user equipment modem device. Method 900 advances to act 960 and ends.

Determining uplink jitter at act 930 may comprise applying a function to raw, or absolute, jitter corresponding to packets of the flow transmitted by the user appliance device at act 925. For example, a function may comprise determining at act 930 an average of multiple jitter values corresponding to multiple packets transmitted at act 925. In another example, a function may comprise determining a highest, a longest, or a worst jitter corresponding to a packet transmitted at act 925 during a configured uplink jitter determination period. Uplink jitter reporting configuration information transmitted at act 920 may comprise a function indication, or a mode indication, such as reporting mode indication 458 described in reference to FIG. 4, indicative of a function, or a smoothing function, to be applied to packets transmitted at act 925. The function indicated by indication 458 may be used to determine, at act 930 during a configured uplink jitter determination period, a jitter value to be applied to an uplink jitter reporting criteria received in uplink jitter reporting configuration information at act 920, to determine, at act 935, whether the reporting criterion is satisfied. Different functions to be applied, at act 930 during a configured uplink jitter determining period, to packets transmitted at act 925 may be desirable for different scenarios. For example, a worst uplink jitter determined during an uplink jitter determining period at act 930 may result in a lowest waste of uplink resources scheduled by the radio access network node but may also result in a lower uplink transmission rate of packets generated at act 925 and may also result in packets being buffered at the user equipment modem device longer before being transmitted thereby to the radio access network node. On the other hand, using an averaging function during an uplink jitter determining period at act 930 to determine an uplink jitter value to be used at act 935 to determine whether to transmit an uplink jitter report or not may result in less signaling overhead being used to transmit uplink jitter reports from the user equipment modem device to the radio access network node because the averaging of uplink jitter determined at act 930 may reduce occurrences of uplink jitter being determined as exceeding an uplink jitter criterion at act 935. However, using an averaging function at act 930 may result in more unused, or wasted, uplink resources that have been granted to the user equipment modem device to transmit packets to the radio access network node. This may be the case if the user equipment modem device has not received a packet from the user appliance via a short-range wireless communication link established at act 910 before a scheduled instant of an uplink resource that would otherwise have been usable to transmit a packet received from the user appliance if a jitter that is much higher than the average determined jitter had not caused the packet to arrive at the user equipment modem device after the scheduled instant. In an embodiment, the user equipment modem device may determine a function to apply at act 930 to packets transmitted at act 925 based on channel conditions with respect to long-range wireless communication link between the user equipment modem device and the radio access network node, or based on a number of scheduled and granted uplink resources that have been unused by the user equipment modem device to transmit packets received from a user appliance tethered to the user equipment modem device via a short-range wireless communication link.

Turning now to FIG. 10, the figure illustrates an example embodiment method 1000 comprising at block 1005 receiving, by a user equipment comprising a processor from a radio access network node, an uplink jitter report configuration comprising at least one uplink jitter reporting criterion; at block 1010 receiving, by the user equipment from a user device that is tethered to the user equipment via a short-range wireless communication link, a first protocol data unit of a traffic flow corresponding to the user device to result in a received protocol data unit; at block 1015 analyzing, by the user equipment, the received protocol data unit with respect to the at least one uplink jitter reporting criterion to result in an analyzed protocol data unit; at block 1020 responsive to the analyzed protocol data unit satisfying the at least one uplink jitter reporting criterion, transmitting, by the user equipment to the radio access network node, an uplink jitter report comprising an uplink jitter indication indicative of an uplink jitter corresponding to the short-range wireless communication link; and at block 1025 wherein the uplink jitter report is usable by the radio access network node to schedule an uplink resource usable by the user equipment to transmit, to the radio access network node, a second protocol data unit of the traffic flow.

Turning now to FIG. 11, the figure illustrates an example radio access network node, comprising at block 1105 a processor configured to receive, from a radio access network node, an uplink jitter report configuration comprising at least one uplink jitter reporting criterion, and at least one jitter-determining function indication; at block 1110 receive, from a first wireless communication component that is tethered to the user equipment via a first short-range wireless communication link, at least one first protocol data unit of a first traffic flow corresponding to the first wireless communication component to result in at least one received first protocol data unit; at block 1115 receive, from a second wireless communication component that is tethered to the user equipment via a second short-range wireless communication link, at least one second protocol data unit of a second traffic flow corresponding to the second wireless communication component to result in at least one received second protocol data unit; at block 1120 analyze the at least one received first protocol data unit according to a first function indicated by a first of the at least one jitter-determining function indication to result in a first uplink jitter corresponding to the first wireless communication component; at block 1125 analyze the at least one received second protocol data unit according to a second function indicated by a second of the at least one jitter-determining function indication to result in a second uplink jitter corresponding to the second wireless communication component; at block 1130 analyze the first uplink jitter with respect to a first criterion of the at least one uplink jitter reporting criterion to result in an analyzed first uplink jitter; at block 1135 analyze the second uplink jitter with respect to a second criterion of the at least one uplink jitter reporting criterion to result in an analyzed second uplink jitter; at block 1140 responsive to the analyzed first uplink jitter satisfying the first criterion or the analyzed second uplink jitter satisfying the second criterion, transmit, to the radio access network node, an uplink jitter report comprising a first uplink jitter indication indicative of the analyzed first uplink jitter or a second uplink jitter indication indicative of the analyzed second uplink jitter; and at block 1145 wherein the uplink jitter report is to be used by the radio access network node to schedule an uplink resource usable by the user equipment to transmit, to the radio access network node, a third protocol data unit of the first traffic flow or a fourth protocol data unit of the second traffic flow.

Turning now to FIG. 12, the figure illustrates a non-transitory machine-readable medium 1200 comprising at block 1205 executable instructions that, when executed by a processor of a radio access network node, facilitate performance of operations, comprising receiving, from a radio access network node, an uplink jitter report configuration comprising at least one uplink jitter reporting criterion; at block 1210 receiving, during a configured jitter-determination period from a wireless appliance that is tethered to the user equipment via a short-range wireless communication link, a traffic flow, comprising packets, corresponding to the wireless appliance to result in received packets; at block 1215 determining an uplink jitter value corresponding to the received packets; at block 1220 analyzing the uplink jitter value with respect to the at least one uplink jitter reporting criterion to result in an analyzed uplink jitter value; at block 1225 responsive to the analyzed uplink jitter value satisfying the at least one uplink jitter reporting criterion, transmitting, to the radio access network node, an uplink jitter report comprising an uplink jitter indication indicative of the uplink jitter value, wherein the uplink jitter report is to be used by the radio access network node to schedule an uplink resource usable by the user equipment to transmit, to the radio access network node, at least one packet of the traffic flow received by the user equipment from the wireless appliance; at block 1230 responsive to the uplink jitter report, receiving, from the radio access network node, an uplink resource grant indication indicative of a granted uplink resource usable to transmit packets corresponding to the traffic flow; and at block 1235 transmitting, to the radio access network node, at least one packet corresponding to the traffic flow according to the granted uplink resource.

Figure 13:
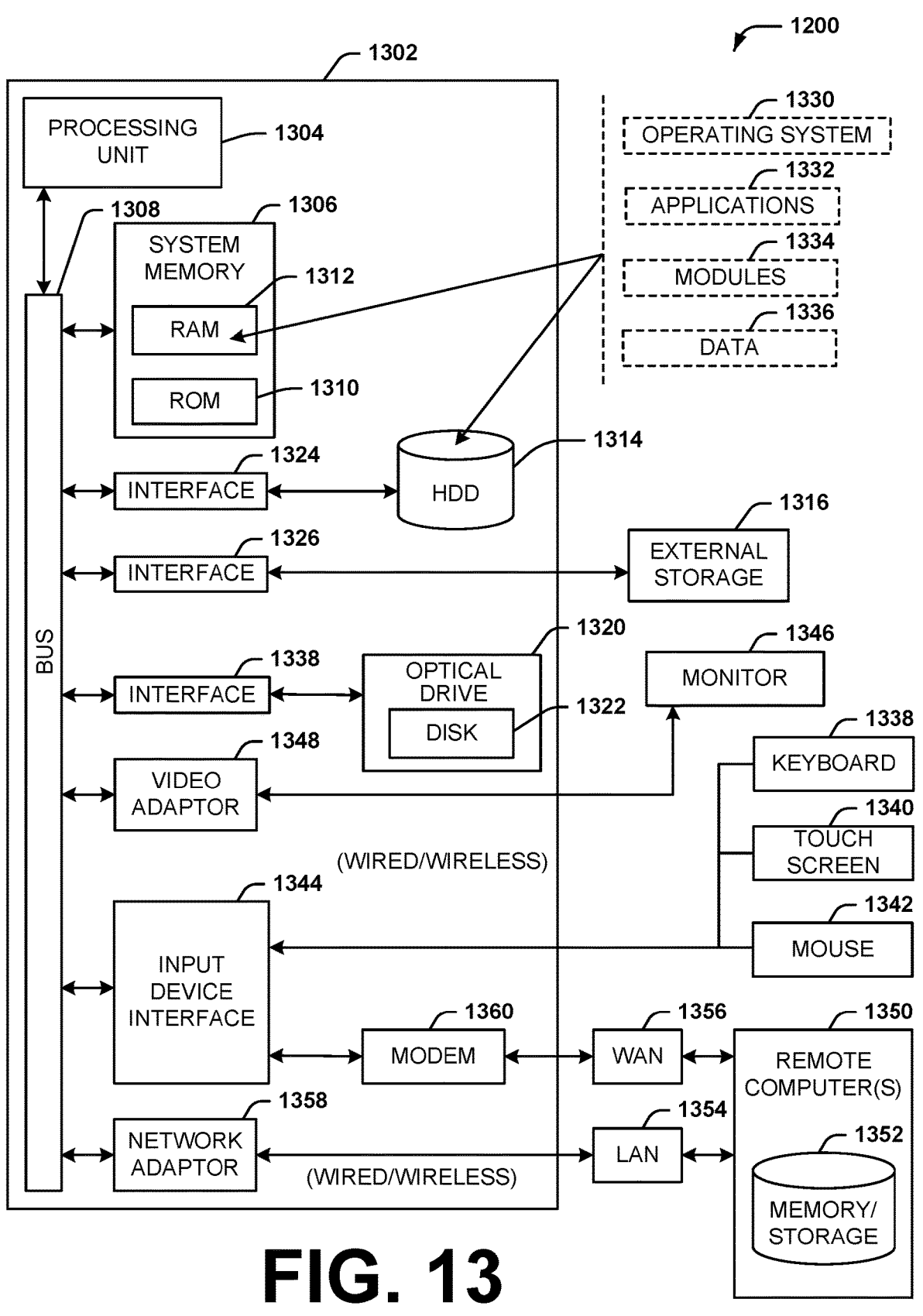
FIG. 13 illustrates an example computer environment.

In order to provide additional context for various embodiments described herein, FIG. 13 and the following discussion are intended to provide a brief, general description of a suitable computing environment 1300 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per sc.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors and may include a cache memory. Dual micro-processors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS)

can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

Computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid-state drive (SSD) could be used in addition to, or in place of, an HDD 1310. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can comprise a security module, such as a trusted processing module (TPM). For instance, with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/ storage device 1352. It will be appreciated that the network connections shown are examples and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 14:
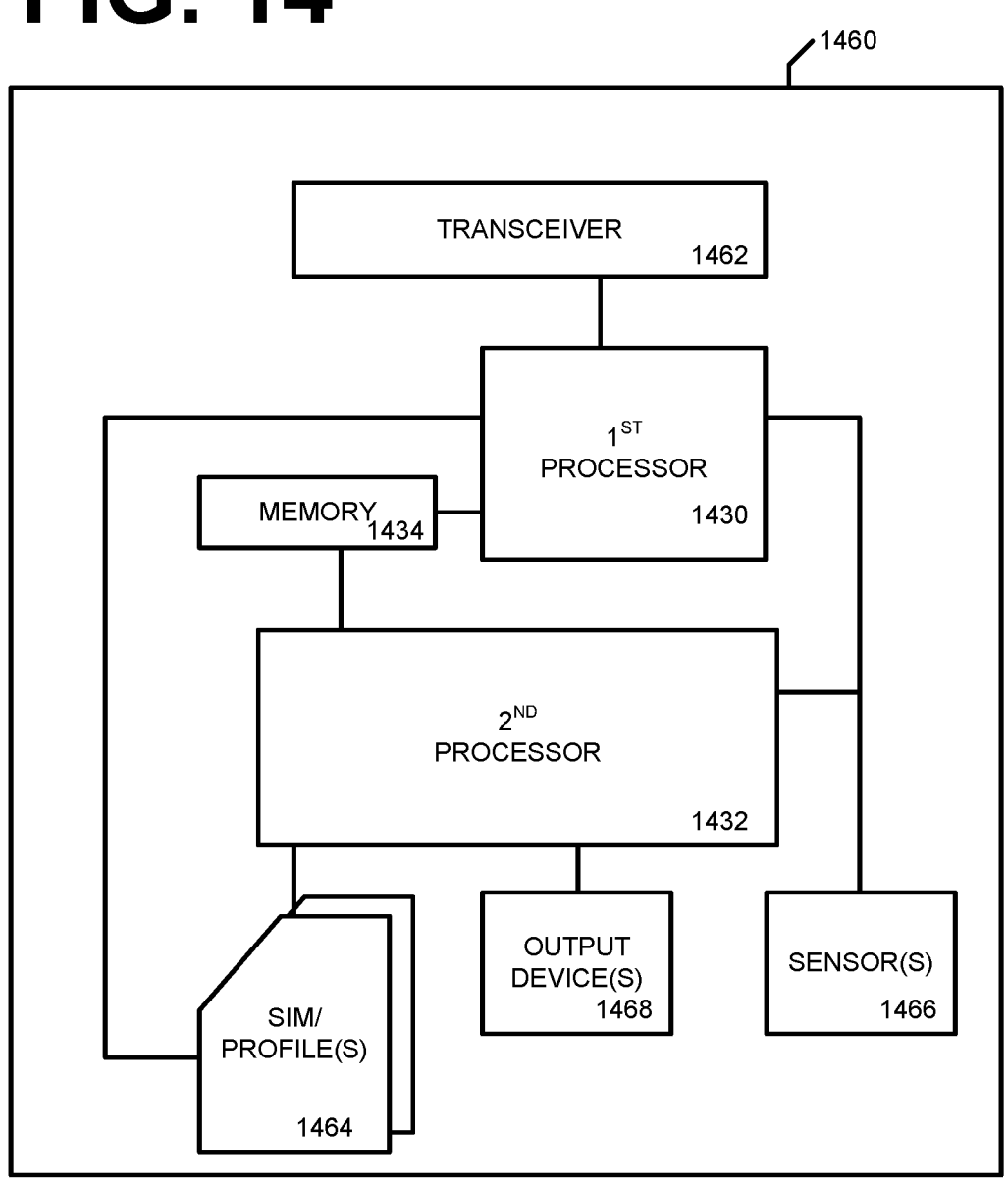
FIG. 14 illustrates a block diagram of an example wireless user equipment.

Turning now to FIG. 14, the figure illustrates a block diagram of an example UE 1460. UE 1460 may comprise a smart phone, a wireless tablet, a laptop computer with wireless capability, a wearable device, a machine device that may facilitate vehicle telematics, and the like. UE 1460 comprises a first processor 1430, a second processor 1432, and a shared memory 1434. UE 1460 includes radio front end circuitry 1462, which may be referred to herein as a transceiver, but is understood to typically include transceiver circuitry, separate filters, and separate antennas for facilitating transmission and receiving of signals over a wireless link, such as one or more wireless links 125, 135, or 137 shown in FIG. 1. Furthermore, transceiver 1462 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 14, UE 1460 may also include a SIM 1464, or a SIM profile, which may comprise information stored in a memory (memory 34 or a separate memory portion), for facilitating wireless communication with RAN 105 or core network 130 shown in FIG. 1. FIG. 14 shows SIM 1464 as a single component in the shape of a conventional SIM card, but it will be appreciated that SIM 1464 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1464 and another device, which may be a component of RAN 105 or core network 130 shown in FIG. 1). A SIM profile 1464 may also comprise identifying information that is unique to the SIM, or SIM profile, such as, for example, an International Mobile Subscriber Identity ("IMSI") or information that may make up an IMSI.

SIM 1464 is shown coupled to both the first processor portion 1430 and the second processor portion 1432. Such an implementation may provide an advantage that first processor portion 30 may not need to request or receive information or data from SIM 1464 that second processor 1432 may request, thus eliminating the use of the first processor acting as a 'go-between' when the second processor uses information from the SIM in performing its functions and in executing applications. First processor 1430, which may be a modem processor or baseband processor, is shown smaller than processor 1432, which may be a more sophisticated application processor, to visually indicate the relative levels of sophistication (i.e., processing capability and performance) and corresponding relative levels of operating power consumption levels between the two processor portions. Keeping the second processor portion 1432 asleep/ inactive/in a low power state when UE 1460 does not need it for executing applications and processing data related to an application provides an advantage of reducing power consumption when the UE only needs to use the first processor portion 1430 while in listening mode for monitoring routine configured bearer management and mobility management/maintenance procedures, or for monitoring search spaces that the UE has been configured to monitor while the second processor portion remains inactive/asleep.

UE 1460 may also include sensors 1466, such as, for example, temperature sensors, accelerometers, gyroscopes, barometers, moisture sensors, and the like that may provide signals to the first processor 1430 or second processor 1432. Output devices 1468 may comprise, for example, one or more visual displays (e.g., computer monitors, VR appliances, and the like), acoustic transducers, such as speakers or microphones, vibration components, and the like. Output devices 1468 may comprise software that interfaces with output devices, for example, visual displays, speakers, microphones, touch sensation devices, smell or taste devices, and the like, that are external to UE 1460.

The following glossary of terms given in Table 1 may apply to one or more descriptions of embodiments disclosed herein.

TABLE 1

| Term | Definition |
| --- | --- |
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |

TABLE 1-continued

| Term | Definition |
| --- | --- |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| UE | User equipment |
| CBR | Channel busy ratio |
| SCI | Sidelink control information |
| SBFD | Sub-band full duplex |
| CLI | Cross link interference |
| TDD | Time division duplexing |
| FDD | Frequency division duplexing |
| BS | Base-station |
| RS | Reference signal |
| CSI-RS | Channel state information reference signal |
| PTRS | Phase tracking reference signal |
| DMRS | Demodulation reference signal |
| gNB | General NodeB |
| PUCCH | Physical uplink control channel |
| PUSCH | Physical uplink shared channel |
| SRS | Sounding reference signal |
| NES | Network energy saving |
| QCI | Quality class indication |
| RSRP | Reference signal received power |
| PCI | Primary cell ID |
| BWP | Bandwidth Part |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

receiving, by a user equipment comprising at least one processor from a radio access network node, an uplink jitter report configuration comprising at least one uplink jitter reporting criterion and at least one an uplink jitter quantization map;

receiving, by the user equipment from a user device that is tethered to the user equipment via a short-range wireless communication link, a first protocol data unit of a traffic flow corresponding to the user device to result in a received protocol data unit;

analyzing, by the user equipment, the received protocol data unit with respect to the at least one uplink jitter reporting criterion to result in an analyzed protocol data unit;

based on the analyzed protocol data unit, determining, by the user equipment, an uplink jitter quantization range corresponding to the short-range wireless communication link;

based on the uplink jitter quantization map, determining, by the user equipment, an uplink jitter index corresponding to the uplink jitter quantization range; and responsive to the analyzed protocol data unit satisfying the at least one uplink jitter reporting criterion, transmitting, by the user equipment to the radio access network node, an uplink jitter report comprising an uplink jitter indication indicative of an uplink jitter corresponding to the short-range wireless communication link, wherein the uplink jitter report is usable by the radio access network node to schedule an uplink resource usable by the user equipment to transmit, to the radio access network node, a second protocol data unit of the traffic flow, and wherein the uplink jitter indication comprises an uplink jitter index indication that comprises the uplink jitter index.

2. The method of claim 1, wherein the short-range wireless communication link is one of: a WiGig link, a Wi-Fi link, or a Bluetooth link.

3. The method of claim 1, wherein the at least one uplink jitter reporting criterion comprises an evaluation based on a percent difference threshold, wherein the analyzing the received protocol data unit with respect to the at least one uplink jitter reporting criterion comprises comparing, to the percent difference threshold, a difference between an expected protocol data unit transmission periodicity corresponding to the traffic flow at the user device and a protocol data unit reception periodicity corresponding to the traffic flow at the user equipment.

4. The method of claim 1, wherein the at least one uplink jitter reporting criterion comprises an evaluation based on a function corresponding to a transmission periodicity associated with the traffic flow at the user device and corresponding to a protocol data unit reception periodicity associated with the traffic flow at the user equipment, and wherein the transmission periodicity associated with the traffic flow at the user device is an expected protocol data unit transmission periodicity corresponding to the traffic flow, the method further comprising:

receiving, by the user equipment from the radio access network node, an expected protocol data unit transmission periodicity indication indicative of the expected protocol data unit transmission periodicity corresponding to the traffic flow.

5. The method of claim 1, wherein the at least one uplink jitter reporting criterion comprises an evaluation based on a threshold of a determined number of protocol data units received by the user equipment from the user device during a configured uplink jitter determining period.

6. The method of claim 1, wherein the uplink jitter report configuration comprises an analysis mode indication indicative of a function to be applied to the first protocol data unit in the analyzing, by the user equipment, the received protocol data unit with respect to the at least one uplink jitter reporting criterion to result in the analyzed protocol data unit.

7. The method of claim 1, wherein the uplink jitter corresponding to the short-range wireless communication link is determined based on the analyzed protocol data unit, and wherein the uplink jitter indication of the uplink jitter report comprises data representative of the uplink jitter corresponding to the short-range wireless communication link.

8. The method of claim 1, wherein the user device that is tethered to the user equipment is a first user device, wherein the short-range wireless communication link via which the first user device is tethered to the user equipment is a first short-range wireless communication link, wherein the traffic flow is a first traffic flow corresponding to the first user device, wherein the received protocol data unit is a first received protocol data unit, wherein the analyzed protocol data unit is a first analyzed protocol data unit, wherein the uplink jitter report is a first uplink jitter report, wherein the uplink resource is a first uplink resource, wherein the uplink jitter report is a first uplink jitter report, wherein the uplink jitter indication is a first uplink jitter indication, wherein the analyzing of the received protocol data unit with respect to the at least one uplink jitter reporting criterion comprises analyzing the received protocol data unit with respect to a first uplink jitter reporting criterion of the at least one uplink jitter reporting criterion, the method further comprising:

receiving, by the user equipment from a second user device that is tethered to the user equipment via a second short-range wireless communication link, a third protocol data unit of a second traffic flow corresponding to the second user device to result in a second received protocol data unit;

analyzing, by the user equipment, the second received protocol data unit with respect to a second uplink jitter reporting criterion of the at least one uplink jitter reporting criterion to result in a second analyzed protocol data unit; and responsive to the second analyzed protocol data unit satisfying the second uplink jitter reporting criterion; transmitting, by the user equipment to the radio access network node, a second uplink jitter report comprising a second uplink jitter indication indicative of a second uplink jitter corresponding to the second short-range wireless communication link, wherein the second uplink jitter report is to be used by the radio access network node to schedule a second uplink resource usable by the user equipment to transmit, to the radio access network node, a fourth protocol data unit of the second traffic flow.

9. The method of claim 8, wherein the first user device corresponds to a first application, wherein the second user device corresponds to a second application, and wherein the first application and the second application are different.

10. The method of claim 8, wherein the first uplink jitter report and the second uplink jitter report are combinable to produce a composite uplink jitter report.

11. The method of claim 8, further comprising:

determining, by the user equipment, a first link identifier corresponding to the first short-range wireless communication link, and a second link identifier corresponding to the second short-range wireless communication link, wherein the first uplink jitter report comprises the first link identifier being associated with the first uplink jitter indication and wherein the second uplink jitter report comprises the second link identifier being associated with the second uplink jitter indication.

12. The method of claim 1, wherein the user device comprises a virtual reality appliance.

13. A user equipment, comprising:

a processor, configured to:

receive, from a radio access network node, an uplink jitter report configuration comprising at least one uplink jitter reporting criterion, and at least one jitter-determining function indication;

receive, from a first wireless communication component that is tethered to the user equipment via a first short-range wireless communication link, at least one first protocol data unit of a first traffic flow corresponding to the first wireless communication component to result in at least one received first protocol data unit;

receive, from a second wireless communication component that is tethered to the user equipment via a second short-range wireless communication link, at least one second protocol data unit of a second traffic flow corresponding to the second wireless communication component to result in at least one received second protocol data unit;

analyze the at least one received first protocol data unit according to a first function indicated by a first of the at least one jitter-determining function indication to result in a first uplink jitter corresponding to the first wireless communication component;

analyze the at least one received second protocol data unit according to a second function indicated by a second of the at least one jitter-determining function indication to result in a second uplink jitter corresponding to the second wireless communication component;

analyze the first uplink jitter with respect to a first criterion of the at least one uplink jitter reporting criterion to result in an analyzed first uplink jitter;

analyze the second uplink jitter with respect to a second criterion of the at least one uplink jitter reporting criterion to result in an analyzed second uplink jitter; and responsive to the analyzed first uplink jitter satisfying the first criterion or the analyzed second uplink jitter satisfying the second criterion, transmit, to the radio access network node, an uplink jitter report comprising a first uplink jitter indication indicative of the analyzed first uplink jitter or a second uplink jitter indication indicative of the analyzed second uplink jitter, wherein the uplink jitter report is to be used by the radio access network node to schedule an uplink resource usable by the user equipment to transmit, to the radio access network node, a third protocol data unit of the first traffic flow or a fourth protocol data unit of the second traffic flow.

14. The user equipment of claim 13, wherein the processor is further configured to:

receive, from the radio access network node, a first grant of a first uplink resource usable by the user equipment to transmit, to the radio access network node, the third protocol data unit of the first traffic flow and a second grant of a second uplink resource usable by the user equipment to transmit, to the radio access network node, the fourth protocol data unit of the second traffic flow;

transmit, to the radio access network node using the first uplink resource, the third protocol data unit of the first traffic flow; and transmit, to the radio access network node using the second uplink resource, the fourth protocol data unit of the second traffic flow.

15. The user equipment of claim 13, wherein the first function comprises a first baseline protocol data unit rate corresponding to the first wireless communication component, wherein the second function comprises a second baseline protocol data unit rate corresponding to the second wireless communication component, and wherein the processor is further configured to:

determine a first link identifier corresponding to the first short-range wireless communication link; and determine a second link identifier corresponding to the second short-range wireless communication link, wherein the first uplink jitter indication indicative of the analyzed first uplink jitter is associated with the first link identifier in the uplink jitter report, and wherein the second uplink jitter indication indicative of the analyzed second uplink jitter is associated with the second link identifier in the uplink jitter report.

16. The user equipment of claim 15, wherein the processor is further configured to:

receive, from the radio access network node, a first baseline protocol data unit rate indication indicative of the first baseline protocol data unit rate corresponding to the first wireless communication component; and receive, from the radio access network node, a second baseline protocol data unit rate indication indicative of the second baseline protocol data unit rate corresponding to the second wireless communication component.

17. The user equipment of claim 15, wherein the processor is further configured to:

receive, from the first wireless communication component, a first baseline protocol data unit rate indication indicative of the first baseline protocol data unit rate corresponding to the first wireless communication component; and receive, from the second wireless communication component, a second baseline protocol data unit rate indication indicative of the second baseline protocol data unit rate corresponding to the second wireless communication component.

18. The user equipment of claim 13, wherein the first wireless communication component is a pose portion of an XR appliance and wherein the second wireless communication component is a peripheral portion of an XR appliance.

19. A non-transitory machine-readable medium, comprising executable instructions that, when executed by a processor of a user equipment, facilitate performance of operations, comprising:

receiving, from a radio access network node, an uplink jitter report configuration comprising at least one uplink jitter reporting criterion;

receiving, during a configured jitter-determination period from a wireless appliance that is tethered to the user equipment via a short-range wireless communication link, a traffic flow, comprising packets, corresponding to the wireless appliance to result in received packets;

determining an uplink jitter value corresponding to the received packets;

analyzing the uplink jitter value with respect to the at least one uplink jitter reporting criterion to result in an analyzed uplink jitter value;

responsive to the analyzed uplink jitter value satisfying the at least one uplink jitter reporting criterion, transmitting, to the radio access network node, an uplink jitter report comprising an uplink jitter indication indicative of the uplink jitter value, wherein the uplink jitter report is to be used by the radio access network node to schedule an uplink resource usable by the user equipment to transmit, to the radio access network node, at least one packet of the traffic flow received by the user equipment from the wireless appliance;

responsive to the uplink jitter report, receiving, from the radio access network node, an uplink resource grant indication indicative of a granted uplink resource usable to transmit packets corresponding to the traffic flow; and transmitting, to the radio access network node, at least one packet corresponding to the traffic flow according to the granted uplink resource.

20. The non-transitory machine-readable medium of claim 19, wherein the uplink jitter report configuration comprises an uplink jitter quantization map, the operations further comprising:

determining an uplink jitter quantization range corresponding to the uplink jitter value in the uplink jitter quantization map, wherein the uplink jitter indication comprises an uplink jitter index indicative of the uplink jitter quantization range.

\* \* \* \* \*